(12) United States Patent
Jameson et al.

(10) Patent No.: US 8,205,822 B1
(45) Date of Patent: Jun. 26, 2012

(54) ACTIVE MAPLE SEED FLYER

(75) Inventors: Stephen M. Jameson, Wilmington, DE (US); Brian P. Boesch, Marlton, NJ (US); Edward H. Allen, Lancanster, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 2 days.

(21) Appl. No.: 12/786,075

(22) Filed: May 24, 2010

Related U.S. Application Data

(62) Division of application No. 11/717,361, filed on Mar. 13, 2007, now Pat. No. 7,766,274.

(51) Int. Cl.
*B64C 27/00* (2006.01)
(52) U.S. Cl. .................. 244/17.11; 244/137.4; 244/207; 244/23 R
(58) Field of Classification Search ............... 244/137.4, 244/17.11, 207, 23 R
See application file for complete search history.

(56) References Cited

U.S. PATENT DOCUMENTS

| | | | |
|---|---|---|---|
| 1,413,316 A | | 4/1922 | Bradley |
| 1,519,866 A | * | 12/1924 | Marchetti ................. 416/99 |
| 1,651,273 A | | 11/1927 | Heller |
| 2,563,731 A | * | 8/1951 | Masterson ................. 244/2 |
| 2,587,227 A | | 2/1952 | Roy |
| 3,010,678 A | | 11/1961 | Gose |
| 3,397,432 A | * | 8/1968 | Banas ..................... 24/630 |
| 3,612,441 A | | 10/1971 | Abramopaulos ............ 244/2 |
| 3,712,567 A | * | 1/1973 | Ruggeri ................ 244/137.4 |
| 4,417,709 A | * | 11/1983 | Fehrm ................... 244/136 |
| 4,473,335 A | | 9/1984 | Henry |
| 4,886,222 A | * | 12/1989 | Burke .................... 244/1 R |
| 5,125,601 A | * | 6/1992 | Monford, Jr. ............ 244/173.1 |
| 5,149,014 A | | 9/1992 | Faller |
| 5,173,069 A | | 12/1992 | Litos et al. |
| 5,810,636 A | | 9/1998 | Harned |
| 5,813,625 A | | 9/1998 | Hassan et al. |
| 5,836,548 A | | 11/1998 | Dietz et al. |
| 5,984,635 A | | 11/1999 | Keller |
| 6,131,849 A | | 10/2000 | Nyhus |
| 6,375,117 B1 | | 4/2002 | Cain |
| 6,375,124 B1 | * | 4/2002 | Gabriel .................. 244/137.4 |
| 6,460,445 B1 | * | 10/2002 | Young et al. .............. 89/1.51 |
| 6,629,673 B2 | | 10/2003 | Casillas et al. |
| 6,776,375 B1 | * | 8/2004 | Engelhardt et al. ........ 244/173.3 |
| 6,948,685 B2 | * | 9/2005 | Hawthorne .............. 244/129.1 |
| 7,093,788 B2 | * | 8/2006 | Small et al. .............. 244/12.2 |
| 7,104,862 B2 | * | 9/2006 | Dammar .................. 446/36 |
| 7,766,274 B1 | | 8/2010 | Jameson et al. |
| 2005/0258304 A1 | * | 11/2005 | Dammar ................. 244/17.11 |

OTHER PUBLICATIONS

Office Action dated Jun. 11, 2009 issued in parent U.S. Appl. No. 11/717,361, filed Mar. 13, 2007 of Stephen M. Jameson.
http://www.apogeerockets.com/monocopter_movie.asp.

* cited by examiner

*Primary Examiner* — Tien Dinh
*Assistant Examiner* — Justin Benedik
(74) *Attorney, Agent, or Firm* — Howard IP Law Group, PC

(57) ABSTRACT

An unmanned aerial vehicle (UAV) has a payload or body affixed at one end of an elongated airfoil. The entire airfoil/payload combination rotates about a center of mass to define a rotor disk. Thrust is provided by air-augmented rocket engine thrusting tangentially at a location remote from the payload. A control system maintains knowledge of its environment, as by a camera, to produce directional control signals which actuate lift control means in synchronism with the rotational position of the vehicle. A deployable object may be carried. Protection of the stowed vehicle is provided by blister packaging.

5 Claims, 14 Drawing Sheets

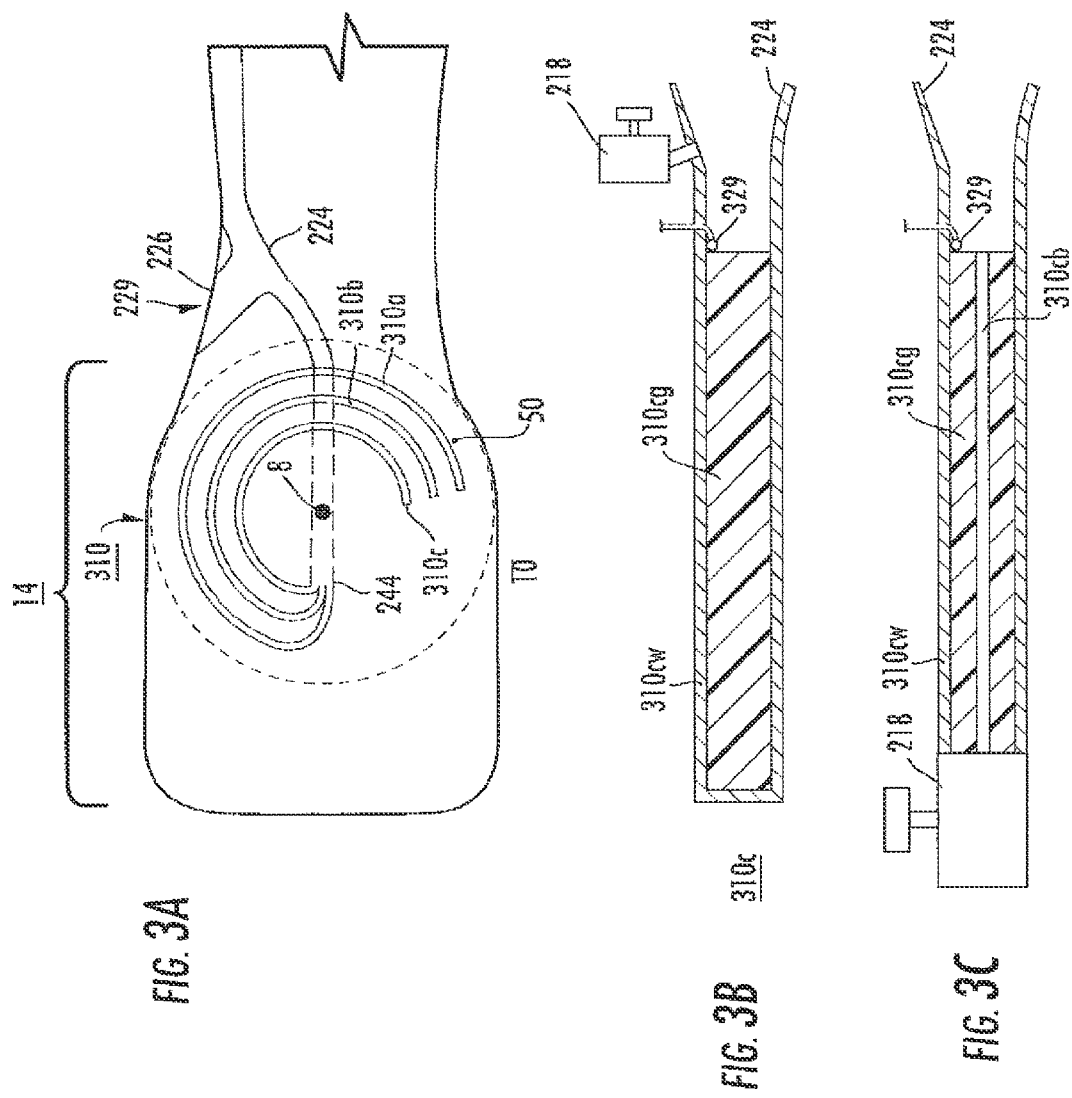

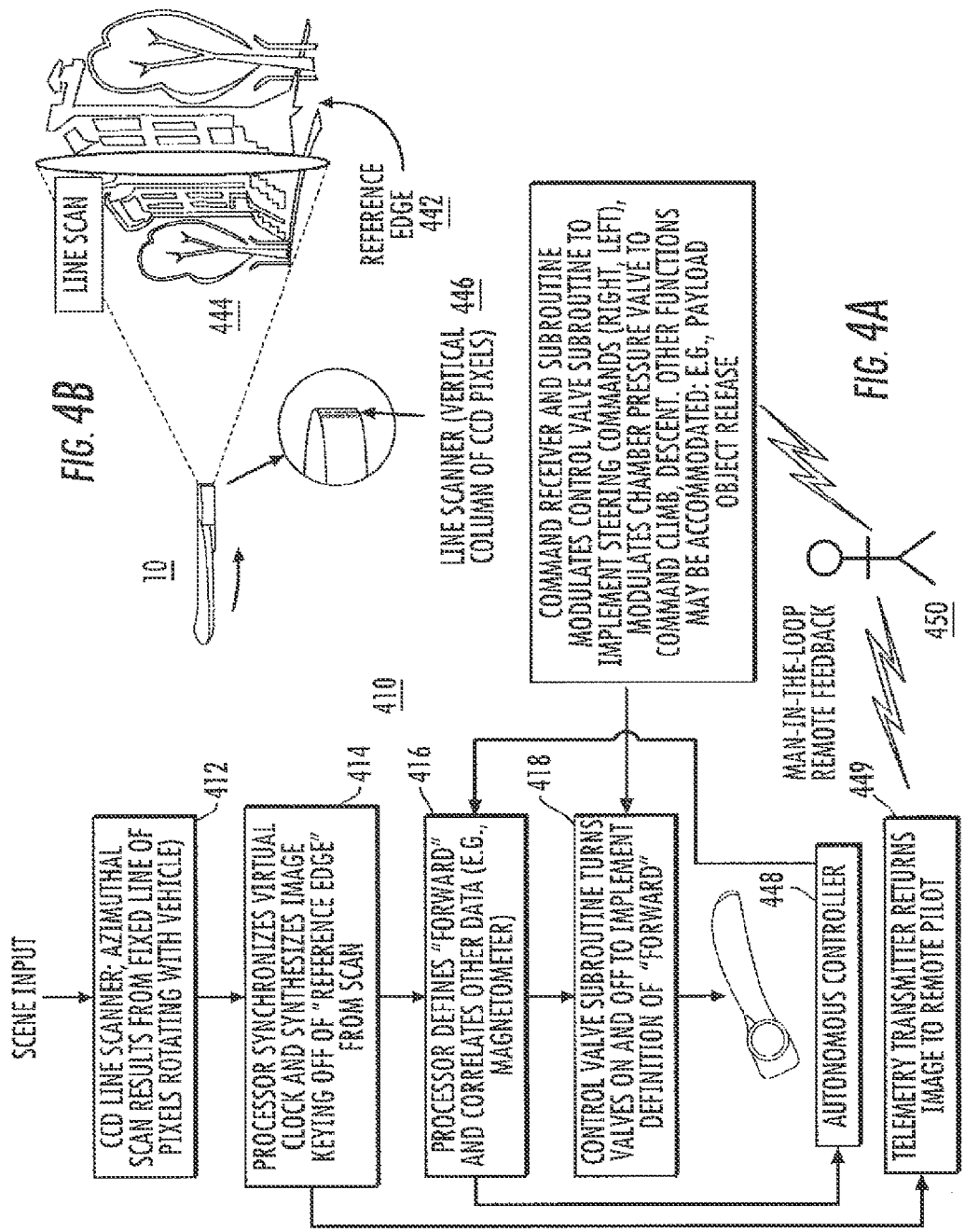

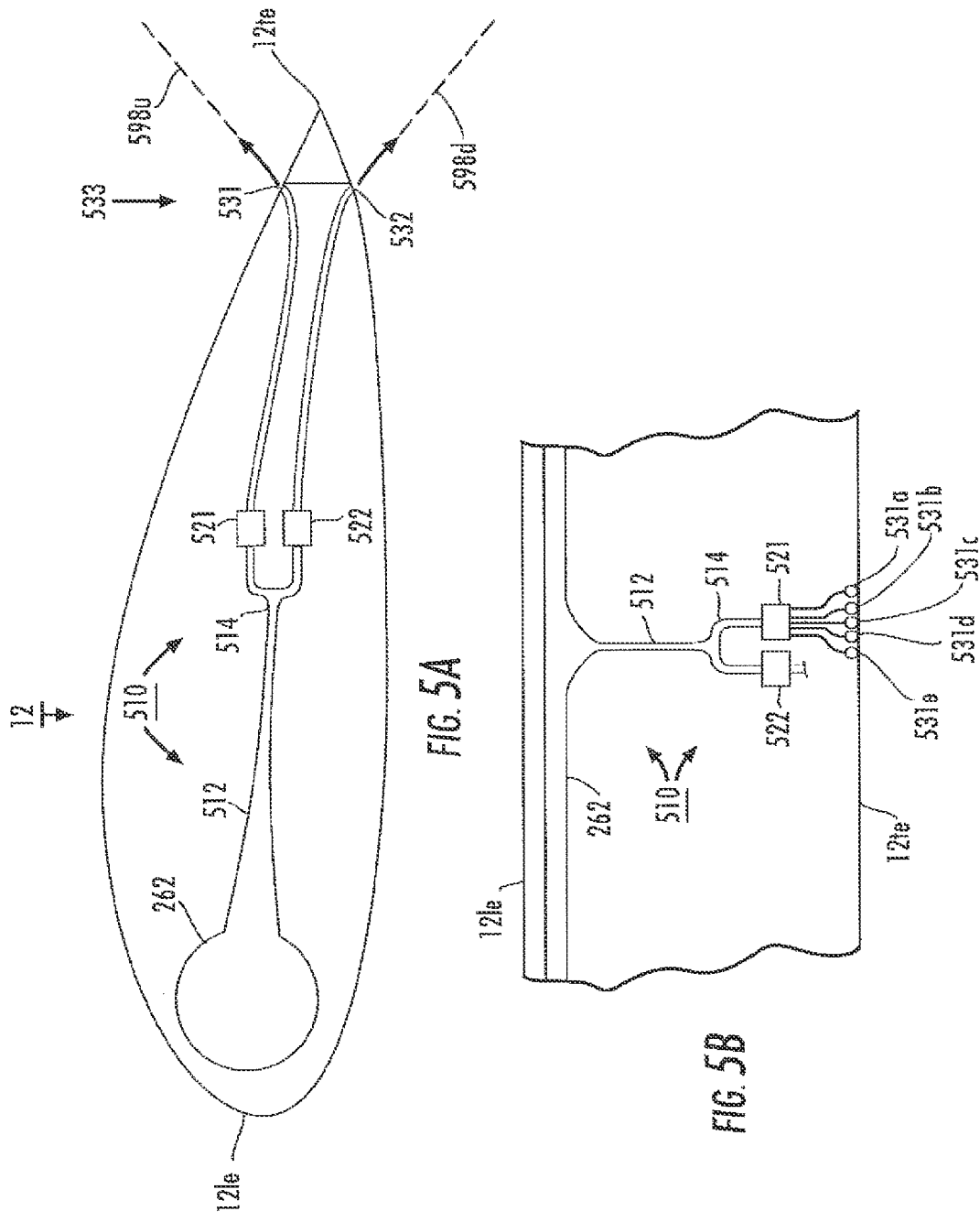

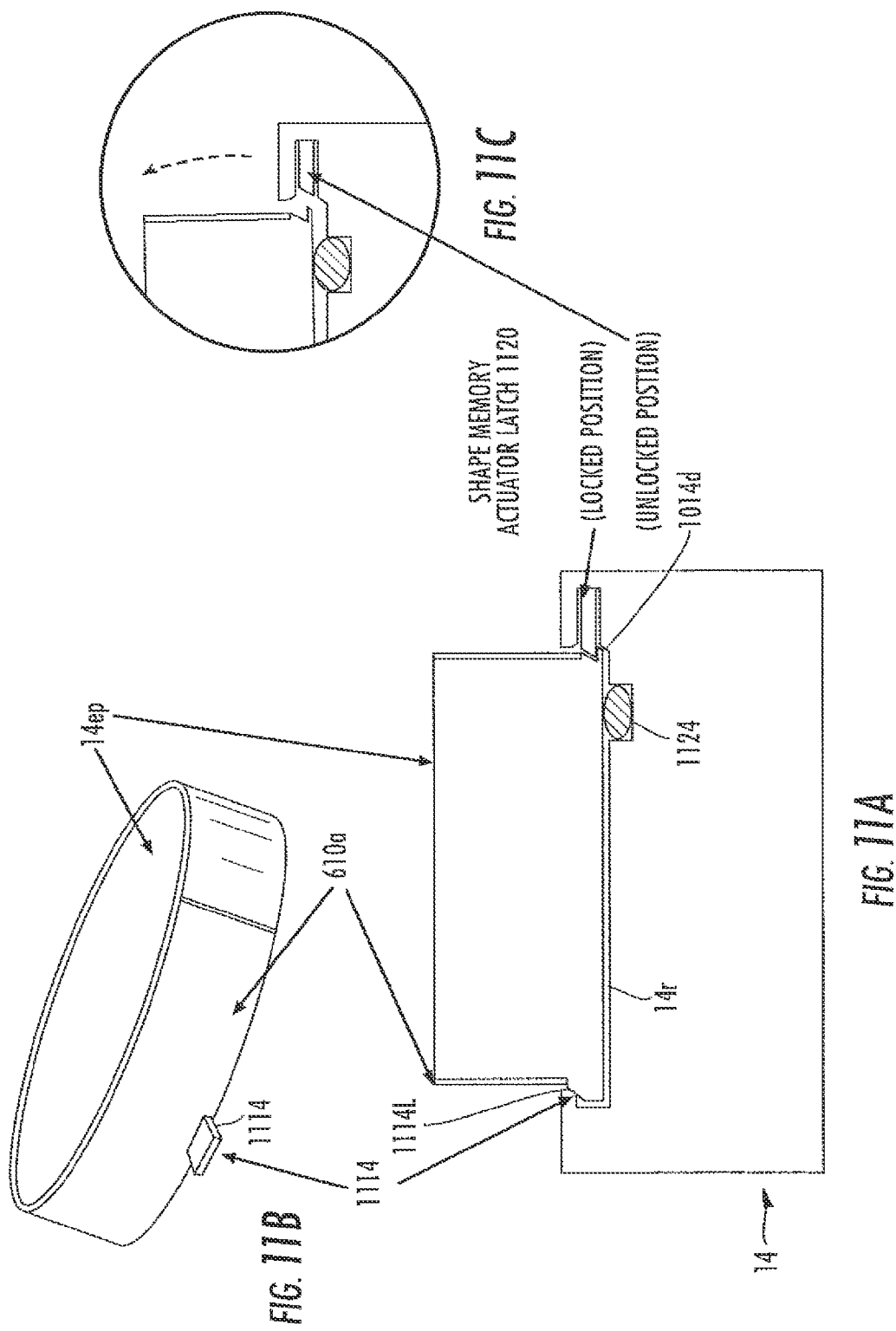

US 8,205,822 B1

ACTIVE MAPLE SEED FLYER

CROSS-REFERENCE TO OTHER APPLICATIONS

This application is a divisional of U.S. patent application Ser. No. 11/717,361, filed Mar. 13, 2007, the entire disclosure of which is incorporated by reference.

FIELD OF THE INVENTION

This invention relates to unmanned aerial vehicles, such as those used for surveillance, including helicopter-like "maple seed" or "monocopter" flying vehicles.

BACKGROUND OF THE INVENTION

The field of unmanned aerial vehicles (UAVs) includes attempts during the American civil war to attack targets by means of unmanned balloons carrying explosive charges. These attempts were generally unsuccessful. During WWI, anti-aircraft gunnery target "drones" were controlled by radio. During WWII, the Japanese used the same balloon bomb technique against the continental United States, resulting in a few deaths. Also during WWII, an Allied program "Operation Aphrodite" attacked surface targets with B-17 bombers converted into drones loaded with explosives. Guidance of the drone B-17s included radio control by a remote operator who viewed a television images from television cameras mounted in the aircraft. In the same general time period, other unmanned aerial vehicles included the German V1 weapons, which were generally unguided in that they were not directed at specific targets, although they were controlled in that they were attitude-stabilized and followed a heading before running out of fuel and crashing. The V2 weapon was also stabilized, and somewhat directionally controlled. More recently, unmanned aerial vehicles have included various missiles such as surface-to-air, air-to-surface, and air-to-air missiles, which are often wholly or partially autonomous, especially in the final attack phase. The Tomahawk "cruise" missile is preprogrammed with a course, and follows the course using Global Positioning Satellite (GPS) positioning and comparison of local sensor data with a preprogrammed digital "map."

Unmanned aerial vehicles have more recently been used for tactical surveillance. This type of vehicle includes the Firebee of Vietnam-war vintage, Hunter, and Pioneer. The Predator is currently in use for surveillance and for other uses. The Predator uses a four-cylinder engine, has a wing span of 48 feet, a length of 27 feet, and a takeoff weight of 2250 lb. It can operate at altitudes of up to 25,000 feet, loiter for up to 40 hours, and in its surveillance role can carry a color video camera, a synthetic-aperture radar, and other sensors. In one of its roles, it can carry and launch Hellfire antitank missiles. The Global Hawk follows the Predator, and provides additional capability, such as a range of more than 12,000 nautical miles and altitudes up to 65,000 feet. However, with a wingspan of 116 feet, length of 44 feet, and 26,000 lb. takeoff weight, it is larger than the Predator. This increased size and weight by comparison with the Predator results in a loiter duration of 24 hours. The Fire Scout is a recently developed reconnaissance and surveillance UAV based on a commercial manned helicopter. The Fire Scout is capable of remote control and of autonomous takeoff and landing from ships or prepared landing sites, and can identify and designate targets. Recent work has been directed toward mounting weapons on the Fire Scout.

Ground troops at the small unit level cannot directly take advantage of information resulting from surveillance by unmanned aerial vehicles (UAVs) such as Predator and Global Hawk. However, ground troops would benefit from availability of small reconnaissance UAVs which could examine their local area under the control of the troops themselves, to report directly to those troops. UAVs for such use suffer from various problems, including that they are regularly destroyed or lost during operation, can be damaged by physical abuse, dirt or water, at least some of which tend to be omnipresent in a combat situation. They also tend to have limited range or loiter time, and often require special training to operate. The Dragon Eye backpack reconnaissance transportable UAV is less than two feet long, electrically powered with two propellers, and can be hand- or bungee-launched. Its weight is about 5.5 lb. Its range or loiter time is limited by the capacity of the batteries that can be carried.

Improved or alternative unmanned aerial vehicles are desired.

SUMMARY OF THE INVENTION

An apparatus for flight according to an aspect of the invention comprises an airfoil with an attached payload, and propulsion means associated with the airfoil for rotating the airfoil and the attached payload, for thereby defining a rotor disk. The apparatus also comprises physical means for adjusting the lift of the airfoil, and control means coupled to the physical means for causing the lift adjustment of the airfoil to tilt the rotor disk. In one embodiment, the rotating airfoil defines a leading edge and a trailing or lagging edge, and the physical means comprises means for ejecting gas at a location near the lagging edge in at least one plane which does not coincide with the plane of the rotor disk. In a preferred embodiment, the means for ejecting gas includes means for ejecting gas in a generally periodic manner in a plane not coincident with the plane of the rotor disk. In one embodiment, the airfoil of the apparatus is elongated, and defines a distal end remote from the payload, and the propulsion means comprises a solid-fuel powered bypass jet, with an exhaust directed generally perpendicular to an axis of the elongation of the airfoil. In one version, the exhaust is directed generally in the plane of the rotor disk. The transverse location of the exhaust may lie generally between the distal end of the airfoil and the payload, or it may be at the distal end of the airfoil.

According to another aspect of the invention, an apparatus for moving a load in a selected direction comprises an airfoil with a fixedly attached payload, and propulsion means associated with the airfoil for rotating the airfoil and the attached load, for thereby rotating the airfoil to define a rotor disk. Physical means are provided for adjusting the lift of the airfoil. Control means are coupled to the physical means for causing the lift adjustment of the airfoil to tilt the rotor disk in a manner which moves the airfoil with the attached load in the selected direction.

A flying apparatus according to another aspect of the invention is for moving a load. The apparatus comprises an airfoil with an attached load fixed to the airfoil, and propulsion means associated with the airfoil for rotating the airfoil and the attached load together, for thereby defining a rotor disk. Physical means are provided for adjusting the lift of the airfoil, and control means are coupled for causing the lift adjustment of the airfoil to provide at least one of collective and cyclic control.

A flying apparatus according to a further aspect of the invention comprises an airfoil with an attached load adjacent a first end of the airfoil, and a jet lying between the first and second ends of the airfoil for rotating the airfoil and attached load.

An apparatus for flight according to an aspect of the invention comprises an airfoil with a payload which is fixed to the airfoil, and propulsion means associated with the airfoil for rotating the airfoil and the payload, thereby defining a rotor disk. The airfoil with payload fixed thereto has no attached payload which rotates at a rate other than the rotation rate of the airfoil. Physical means adjust the lift of the airfoil, and control means are coupled to the physical means for causing the lift adjustment of the airfoil to tilt the rotor disk.

An apparatus for flight comprises an airfoil with a fixedly attached body, where the airfoil and fixedly attached body together defining a center of mass. The attached body includes payload attachment means for attaching a payload centered on the center of mass, which payload, when attached, is fixedly attached to the body. A payload is coupled to the payload attachment means, and propulsion means are associated with the airfoil for rotating the airfoil and the fixedly attached body, for thereby defining a rotor disk. Physical means are provided for adjusting the lift of the airfoil. Control means are coupled to the physical means for causing the lift adjustment of the airfoil to tilt the rotor disk, and control means are provided for controlling the payload attachment means for disengaging the body from the payload at selected one of (a) time and (b) location.

An apparatus for flight according to an aspect of the invention comprises an elongated airfoil with an attached payload, which airfoil defines a longitudinal axis. Propulsion means are associated with the airfoil for rotating the airfoil and the attached payload, for thereby defining a rotor disk. The propulsion means comprises means for generating gas under pressure and means for releasing the gas under pressure in a direction generally tangent to a radius of the rotor disk and from a location near an end of the airfoil. The propulsion means in one embodiment of this aspect of the invention comprises an ejector driven by a fuel grain, and the fuel grain may generate hot gas which is partially combustible. In another embodiment according to this aspect of the invention the means for generating gas under pressure comprises a fuel grain which, in operation, creates partially combustible hot gas under pressure, and a first ejector into which the partially combustible hot gas under pressure is introduced, for mixing the partially combustible hot gas with atmospheric oxygen, to generate hot combusted gas. A second ejector receives the hot combusted gas, and heats atmospheric gas to generate the gas under pressure.

A protective package according to another aspect of the invention is for individually protecting flying vehicles. The protective package comprises a first piece defining a cavity larger in length, width and depth than corresponding dimensions of the flying vehicle. A second piece is provided having dimensions sufficient to occlude the entirety of the cavity. Means are provided for affixing the second piece to the first piece so as to define with the cavity a closed package containing the flying vehicle. In one embodiment, at least one of the first plastic piece and the second piece is transparent. Either the first piece or the second piece, or both, may be of a plastic material. The second piece may be monolithically hinged to the first plastic piece to define a clamshell.

A protective package for accommodating a plurality of flying vehicles according to the invention includes a first generally planar piece defining a plurality, equal in number to the number of the plurality of flying vehicles, of individual open cavities. Each of the open cavities is dimensioned to accommodate one of the flying vehicles. The package also includes a second piece dimensioned to occlude the plurality of individual open cavities. The second piece is applied to the first piece to occlude the open cavities and thereby define the plurality of closed cavities. Each of the closed cavities accommodates one of said flying vehicles. The separate cavities may be separated by a perforated line to aid in separation of the blister-packed vehicles.

A method for storing flying vehicles according to a further aspect of the invention comprises the step of encapsulating each flying vehicle in shrink-wrap film, and heating the shrink-wrap film to cause the film to shrink about the flying vehicle.

Another method for storing flying vehicles according to an aspect of the invention comprises the steps of placing a flying vehicle in each cavity of a sheet defining plural cavities, and applying a single second sheet over the open side of the plural cavities to form sealed chambers, each holding one flying vehicle.

According to another aspect of the invention, the monocopter vehicle includes retaining means for carrying a deployable payload object. In one embodiment, the retaining means comprises a wall defining at least part of a chamber accommodating the deployable payload object. In one version, the wall includes a lip which aids in retaining the deployable payload object, and in another, it includes a withdrawable latch. Yet another version comprises a magnet.

BRIEF DESCRIPTION OF THE DRAWING

FIG. 3A is a simplified plan view of a portion of the vehicle of FIGS. 1A, 1B, and 1C, illustrating details of the storage of fuel for the engine of FIG. 2, FIG. 3B is a simplified cross-sectional view, laid out straight, illustrating details of one possible structure of FIG. 3A, and FIG. 3C is similar to FIG. 3B, illustrating another possible structure;

FIG. 4A is a simplified logic flow chart or diagram illustrating how the flyer is controlled, and FIG. 4B illustrates a flyer with a line-scan camera in an environment including a street scene;

FIG. 11A is a simplified side elevation view of a portion of a vehicle similar to that of FIGS. 10A, 10B, and 10C illustrating retaining of a deployable payload object by means of a shaped memory actuator, FIG. 11B is a simplified perspective or isometric view of the deployable object of FIG. 11A, and FIG. 11C is a detail of the arrangement of FIG. 11A showing an alternative state.

DESCRIPTION OF THE INVENTION

Figure 1A:
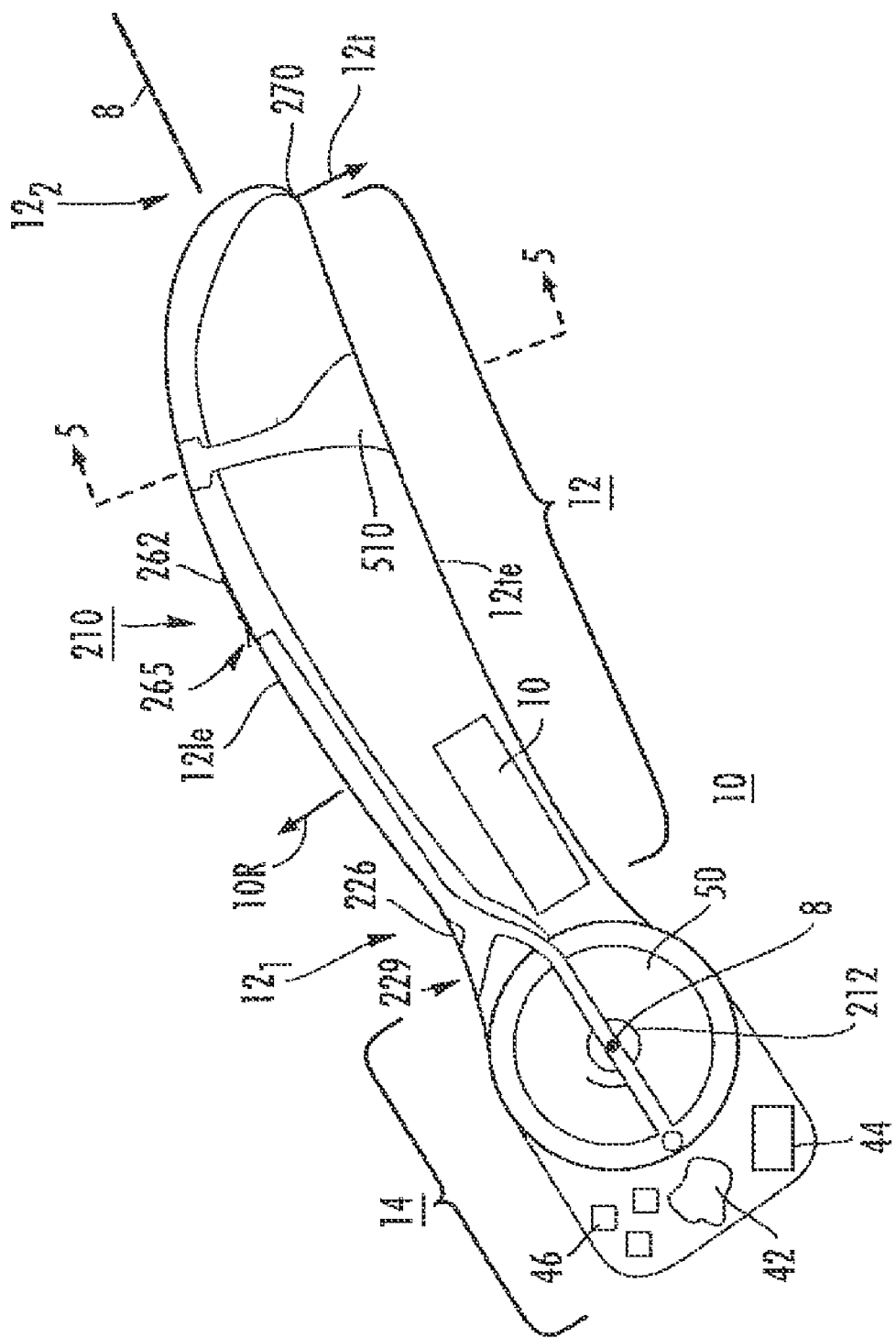
FIG. 1A is a plan view of a vehicle according to an aspect of the invention, partially cut away to reveal interior details.

Helicopters are well known in the art. A helicopter includes a body or payload supported by a rotating airfoil or blade system. The rotating blade system traces out, defines or subtends a rotor disk, which may be understood as producing vertical lift due to the action of the rotating blade system. Each rotating blade of the rotating blade system is an airfoil which is controlled to contribute to the lift, thrust and directional control of the rotor disk, which in turn is imparted to the body. The body, and anything it carries, may be viewed as being the payload which the rotor disk supports. The airfoils of a typical helicopter are connected to a hub region driven by the engine, which is located in the body. The torque applied to provide motion of the airfoils of the rotor disk, by Newton's laws, cause an equal and opposite torque tending to rotate the body in a direction opposite to that of the airfoils. In order to provide a stationary platform, the rotation of the body of the helicopter is normally controlled, as for example by providing a tail rotor which tends to torque the body of the helicopter in a direction opposite to that engendered by the airfoil rotation torque. Alternatively, coaxial, contrarotating propellers or rotor disks can reduce the torquing of the body, and some cargo helicopters use spaced-apart contrarotating rotor blades. Such helicopters with contrarotating rotor blades may not require powerful auxiliary rotation devices to maintain their attitude.

In a typical helicopter, the rotor system includes a rotor head, rotor blades, and a control system that drives and controls the pitch angles of the blade. An axis of rotation is an imaginary line that passes through a point on which the body rotates, where the plane of rotation is orthogonal to the axis of rotation. When a helicopter is flying in a particular "forward" direction, the blades of a helicopter rotor disk alternately speed up ("advancing" blade) and slow down ("retreating" blade) relative to the average airflow, which tends to cause the lift provided by each blade to vary with its rotational position, thereby causing a dissymmetry of lift. Control of the lift and directional control provided by the rotor disk tends to tilt the rotor disk (thereby moving its axis of rotation away from the vertical) to impart "horizontal" directional force as well as lift. This control may be provided in part by a "swash plate" which is coupled to the blades to change the angle of incidence of the blades as a function of rotational position relative to the body of the helicopter. The controls are referred to as "collective," which acts on all of the blades simultaneously, and "cyclic," which acts differentially on the blades as a function of rotational position. Thus, "collective" control tends to affect the lift of the rotor disk as a whole, and "cyclic" control tends to tilt the rotor disk. The art of aircraft, including helicopters, and of propellers and rotors, is well known.

According to an aspect of the invention, an unmanned aerial vehicle (UAV) without a separate fuselage has a payload or body affixed at one end of a single elongated airfoil. The entire airfoil/payload combination rotates so that the airfoil traces out a rotor disk that behaves much as the rotor disk of a conventional helicopter. The rotor disk may be viewed as being the vehicle, and the rotor blade is simply a lifting rotor. Thrust for rotating the rotor in one embodiment is provided by a jet, which may be tip-mounted. In one advantageous embodiment, the thrust is provided by an air-augmented rocket engine thrusting tangentially at a location remote from the payload, and preferably at that tip of the airfoil remote from the payload. In a preferred embodiment, a control system maintains knowledge of its environment, as by a camera, magnetometer or functionally similar means, to produce directional control signals which actuate lift control means in synchronism with the rotational position of the vehicle. Such a control system allows the vehicle to be directed in a preferred or "forward" direction, and also allows control of lift and therefore of ascent and decent.

Figure 1B:
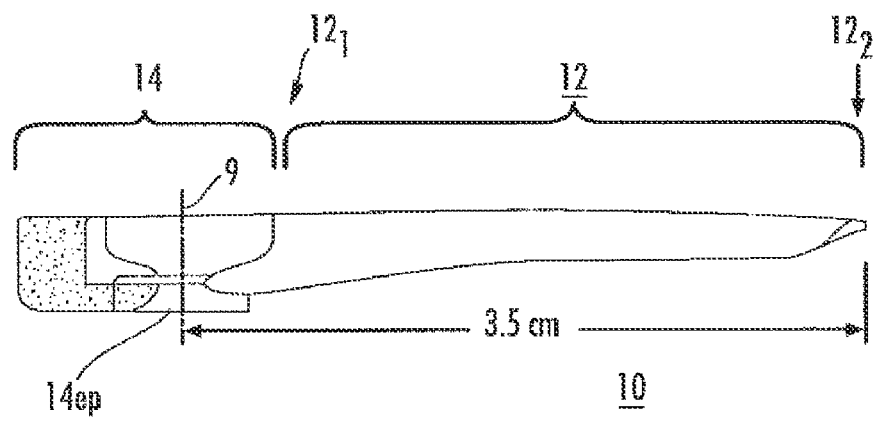
FIG. 1B is first side elevation thereof.
Figure 1C:
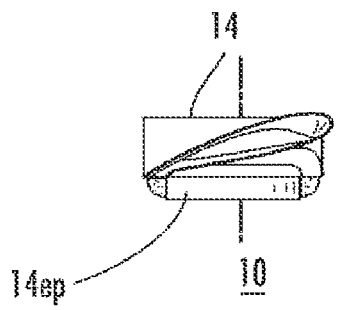
FIG. 1C is a second side elevation thereof.

FIGS. 1A, 1B, and 1C are top plan and first and second elevation views, respectively, of a vehicle according to an aspect of the invention. The description herein may include relative placement or orientation words such as "top," "bottom," "up," "down," "lower," "upper," "horizontal," "vertical," "above," "below," as well as derivative terms such as "horizontally," "downwardly," and the like. These and other terms should be understood as to refer to the orientation or position then being described, or illustrated in the drawing(s), and not to the orientation or position of the actual element(s) being described or illustrated. These terms are used for convenience in description and understanding, and do not require that the apparatus be constructed or operated in the described position or orientation. Terms concerning mechanical attachments, couplings, and the like, such as "connected," "attached," "mounted," refer to relationships in which structures are secured or attached to one another either directly or indirectly through intervening structures, as well as both movable and rigid attachments or relationships, unless expressly described otherwise.

In FIGS. 1A, 1B, and 1C, a vehicle 10 includes an elongated airfoil or blade 12 defining a first or root end $12_1$ and a second or tip end $12_2$, and also defines a body or payload designated generally as 14, which is rigidly affixed to first end $12_1$ of the airfoil 12. The combination of the airfoil 12 and the body or payload 14 has a center of mass designated 8. The center of mass corresponds with the axis or center of rotation 9 of the structure during operation. The structure defined by vehicle 10 has the same general shape as Samara, the winged fruit of trees such as maples. The vehicle is designated Samarai, blending the name of the fruit with the term "samurai" or warrior. The Samarai is a single-wing helicopter provided with power, flight stabilization, and directional control.

Multiple-rotor fuselage-less flying vehicles are known. The concept of a fuselage-less single-blade air vehicle has been known per se since at least the 1970s, as exemplified by the "Maple Seed" toy aircraft, conceived and marketed by Ned Allen. U.S. Pat. No. 5,173,069 was issued on Dec. 22, 1992 in the name of Litos et al., disclosing a toy autorotating flyer having the same general configuration as that shown in FIGS. 1A, 1B, and 1C. A major advantage of such structures is that they are inherently stable aerodynamically. This toy and other like toys are not useful for surveillance or reconnaissance applications because they autorotate only under the influence of gravity, and can basically only "fly" in a downward direction. For surveillance and reconnaissance purposes, a flying vehicle must be able to at least controllably ascend and proceed in a desired direction. It is advantageous if it can also be controlled to descend. The prior art also includes a rocket-powered "monocopter" flying vehicle, a video of which is available at www.apogeerockets.com/monocopter_movie.asp.

Figure 2:
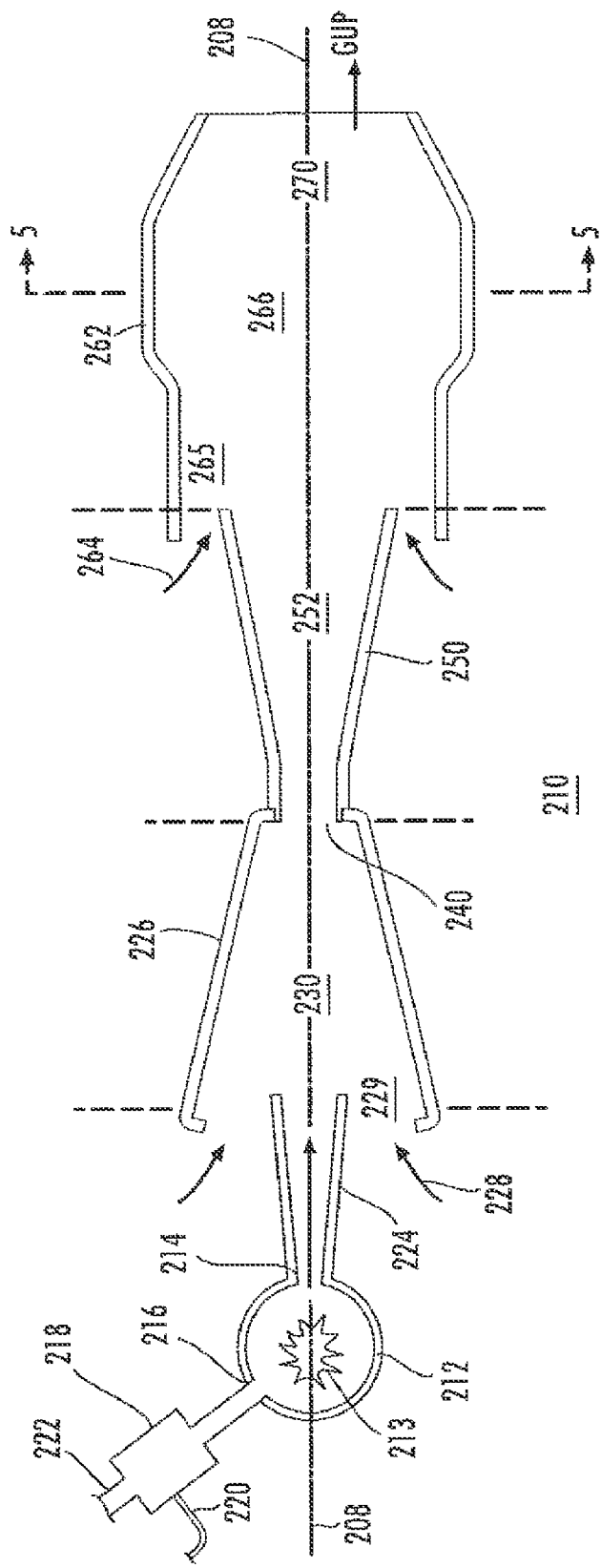
FIG. 2 is a simplified representation of an engine which can be used in the vehicle of FIGS. 1A, 1B, and 1C, with the engine represented laid out in a straight line for ease of comprehension.

The preferred engine components for powering the vehicle of FIGS. 1A, 1B, and 1C are illustrated in FIG. 2. The engine falls into the class of air-augmented rockets (AAR), which are well understood in the art. The engine components will be machined or otherwise formed from high-temperature material, such as nickel. The AAR approach allows much of the oxidizer required for combustion to be off-loaded, and supplied by atmospheric oxygen harvested from the air. Thus, the oxidizer mass of the fuel grain(s) can be less than is usual in a solid-fuel rocket engine. The propulsive efficiency is maximized by the use of air injection and exhaust mass flow augmentation and deceleration, and the specific energy should be comparable to that of a liquid-fuel-based system, and much greater than that of batteries, supercapacitors, or fuel cells.

Figure 1D:
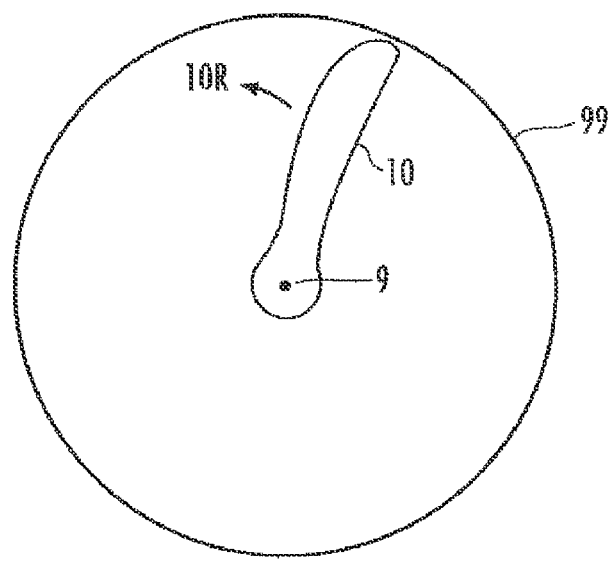
FIG. 1D illustrates a rotor disk swept by a rotating structure of FIGS. 1A, 1B, and 1C.

In FIGS. 1A, 1B, and 1C, the vehicle 10 includes an air-augmented solid-fuel rocket engine designated generally as 210. Engine 210 includes three stages: an initial stage in which the fuel grain is ignited and burned generating hot high-pressure, fuel-rich gas that exhausted from a nozzle into a second stage. The second stage comprises a supersonic ejector in which the hot, fuel-rich gas from the first stage entrains additional air and establishes a normal shock wave across the throat of that ejector which then allows the second stage to burn the fuel-rich gas creating additional pressure and thrust power. The exhaust from the second stage passes into a third stage, a simple subsonic, thrust augmentation ejector that dilutes the hot exhaust with more air cooling it and increasing the mass flow further. FIG. 2 is a simplified illustration of the rocket engine 210 which powers the vehicle 10 of FIGS. 1A, 1B, and 1C. It should be understood that the rocket as illustrated in FIG. 2 is set out along a straight axis 208 for ease of understanding, but fitting it into the flying vehicle 10 of FIGS. 1A, 1B, and 1C requires that it be somewhat bent to match the curved shape of the leading wing edge 12e of airfoil 12. In FIG. 2, the solid propellant or fuel uses gas-generating power technology. The fuel grain is any grain that produces hot gases that are in part combustible, such as Thiokol type TP-H-3433. The solid propellant lies in a combustion chamber 212 of FIG. 2, where an electrical squib (329 of FIG. 3B) begins a slow combustion. The combustion 213 in chamber 212 produces gas which is more than 50% combustible, and where the temperature is above the ignition temperature of all of the combustible components. The hot combustible gas flows through a nozzle 224 which powers a compressor or primary ejector (which is the essence of the second stage). This compressor is powered by the high-velocity (ideally mach 6 or greater) hot combustible gas from nozzle 224, and entrains an external air flow 228 at an air intake port 229. The hot combustible gas and the entrained air enter a mixing chamber 230 defined by walls 226. The gas flow velocity in the mixing chamber 230 exceeds the flame propagation velocity, so the hot combustible gas does not combust in the mixing chamber, but is mixed and compressed by the narrowing cross-section near a normal shock compressor 240. The entrained air should have about three times the mass, or more, of the hot gas from nozzle 224. The precise ratio is a design selection that determines the supersonic ejector performance in terms of compression ratio. The hot gas-air mixture passes through a normal shock compressor 240 and enters a secondary combustion chamber or diffuser 252 defined by walls 250. The products of secondary combustion in chamber 252 are introduced into a secondary ejector 266 defined by walls 262, entraining a flow 264 of additional air at an air input port 264, again at a 3:1 mass ratio, which air is heated by the products of secondary combustion to generate additional gas expansion. The resulting expanded gases under pressure (GUP) leave ejector chamber 266 and flow from an orifice 270 to provide thrust along a tangent 12t to the rotating tip end 122 of the airfoil or wing 12. This thrust rotates (10R) the structure 10 of FIGS. 1A, 1B, and 1C, including the payload 14, and the rotating structure 10 traces out or subtends a rotor disk 99 about it center of rotation 9, as illustrated in FIG. 1D. Each of the ejectors of engine 210 results in approximately a three-to-one dilution of the hot exhaust gas with air, the full effect being a nine-fold increase in the mass flow and a reduction in the exhaust velocity which increases the thrust efficiency. This tends to greatly increase the mission time including time on station by comparison with a simple rocket or single-stage ejector. The two distinct types of ejectors are desirable as is the combustion process between them in order to achieve maximum efficiency and effectiveness. Experience and analysis have shown that no single ejector can offer more than about three-to-one mass flow augmentation efficiently, so if a 9-to-one augmentation efficiency is desired, two ejectors in series are required. Moreover, experience has shown that the mixing associated with a single ejector tends to consume so much of the enthalpy in the flow that secondary combustion between ejector stage stages becomes desirable to restore it if adequate thrust is to be achieved. If combustion between the ejectors is required, the upstream ejector must operate as a pump and develop a pressure gradient in order to prevent back firing from the secondary combustion. The final ejector can operate at constant pressure device as a simple subsonic mixer provided there no substantial backpressure.

The solid fuel grain for the rocket motor or jet 210 of FIG. 2 is a long cylindrical prism coiled into a continuous spiral to conserve space, or formed into concentric circles of decreasing size toward the center, surrounding the center of mass 8 of FIG. 1A. The spiral-wound or concentric-ring solid fuel grains lie in a circular area 50 as seen in FIG. 1A, and in regions 50a and 50b as illustrated in FIGS. 1B and 1C.

FIG. 3A illustrates details of the propellant or fuel storage of the structure 10 of FIGS. 1A, 1B, and 1C. In FIG. 3A, the region in which the fuel grains are stored is designated 50. Each fuel grain is located within a tube or a hollowed-out groove within a refractory material, a set 310 of three of which are illustrated, namely 310a, 310b, and 310c. It will be appreciated that more or fewer tubes than three can be used. The tubes of set 310 are coiled around the center of mass 8 of the vehicle. A fuel gas manifold 224 connects the openable ends of the tubes of set 310, and leads the combustible gas into the first ejector housing 226. The actual first ejector air intake is designated 229. FIG. 3B illustrates the general shape of a fuel grain tube, designated 310c for definiteness, laid out in a straight line. In FIG. 3B, the metal tube wall is designated 310cw and the solid fuel grain is designated 310cg. The fuel grain is the Thiokol type TP-H-3433, or similar, which when ignited by an igniter illustrated as 329 begins partial combustion at the exposed face, generating hot combustible gas. The hot combustible gas enters manifold 224 for energizing the primary ejector 224, 226, 230 of FIG. 2. Fuel ignition is begun in one of the tubes of set 310 by squibs or semiconductor bridge initiators, known in the art. Such initiators operate quickly, on the order of 100 microseconds (µs), and require only about 3 millijoules (mJ) of energy. Once a grain is burning, it is virtually impossible to stop. Some control of the length of burn is achieved by making the grains short, and since they are positioned in parallel, a fresh one can be ignited just before the end of burn of the previous grain, or, if desired, the current grain can be allowed to burn itself out without igniting another. The burn rate of a solid fuel grain such as 310*cg* of FIG. 3B depends upon the pressure at the face. Some control of the pressure can be achieved by a controllable orifice, such as an orifice 218 illustrated by a valve symbol. Any type of microelectromechanical valve can be used to adjust the pressure. More control of the pressure may be possible with an arrangement such as that illustrated in FIG. 3C, in which the fuel grain 310*cg* defines an open axial bore 310*cb* which extends the full length of the grain. The pressure-controlling valve 218 is affixed to that end of tube wall 310*cw* remote from the ignition device 329 and the manifold 224. This arrangement allows the pressure at the burn face to be adjusted to thereby throttle the rocket/ejector apparatus.

In order to prevent cross-ignition of the fuel grains at the manifold 312 of FIG. 3, each fuel grain must be insulated sufficiently from its neighboring grains to prevent inadvertent ignition. The refractory material that houses and surrounds the fuel grain must have sufficient insulation value to accomplish this task. Any of the refractory oxides known in the art (e.g., alumina, zirconia, etc) can serve here. Additional cooling passages can be added if desired when using especially hot fuels or fuels with low ignition temperatures.

Takeoff of the vehicle 10 of FIGS. 1A, 1B, and 1C, powered by a rocket or jet engine, may be aided by a launching device which brings the vehicle 10 up to full rotational speed and ignites the engine when full speed has been reached, in order to conserve on fuel, but this is not believed to be mandatory. The provision of such a launching device is believed to be a simple matter easily made by a person skilled in the art.

FIG. 1A illustrates by 40 a possible location for a solid-state microchip radio/television transceiver (transmitter/receiver). Those skilled in the art know that the efficiency of an antenna in transducing signal is dependent, in part, upon its dimensions. Ideally, communications with the vehicle 10 occur at frequencies at which the available antenna dimensions are sufficient to transduce signals with an efficiency which allows reliable communication with the outside world with an amount of electrical power available from an on-board thin-film battery 42. Moreover, the antenna can be fitted with a backplane or reflector to further improve efficiency. Also, transmission may be pulsed so that a directed beam is emitted from the Samarai only when the antenna is facing the right direction.

Block 44 of FIG. 1A represents microchip television camera and other imaging sensors and electronics which are powered by the battery 42. The images and sensed signals may include part of the information for which the reconnaissance is performed, so the image and sensor information from block 44 may be coupled to the transceiver 40 for transmission to the home base.

In one embodiment of the vehicle 10 of FIGS. 1A, 1B, and 1C, the length of the vehicle from the center of rotation 9 to the tip end 12$_2$ of the airfoil 12 is expected to be 3.5 centimeters. The weight of the vehicle 10 with payload and full load of fuel (2 grams of Thiokol type TP-H-3433 or similar) is expected to be in the region of 10 grams, including a deployable or ejectable 2-gram payload. The spin rate is expected to be 250 Hz, the disk loading 0.25 kg/m$^2$, and the endurance not less than 20 minutes.

Navigation and proximity sensors are represented in FIG. 1A by microchip set 46. One of the problems associated with a vehicle according to an aspect of the invention is that the entire body and rotor rotate, so that any sensors incorporated into the structure and which are used for navigation and or control are spinning about the axis or rotation 9 (FIG. 1B). According to an aspect of the invention, the rotation rate of the craft is determined by the use of a video or television camera which views the outside world, and recurrently sees the same features of the environment as the vehicle spins. This information is used for estimating or determining the spin speed or rate. A clock in an on-board processor determines the angle of the rotor blade relative to the rotor disk using the spin information derived from the camera. A line-scan television camera produces images representing 360° around the environment of the vehicle, including image portions representing the "forward" direction. Real-time imagery in the forward direction can be generated by "de-spinning" the image. The de-spinning can be accomplished on-board, or can be off-loaded to an external controller. The controller in such a case would require knowledge of the spin rate and the rotor blade angle relative to the rotor disk. As an alternative to a line-scan camera, a CCD chip could "snap" a picture at that time at which it faces forward to thereby produce visual signals. In either case, the image information can be used for autonomous control or transmitted to a remote controller for external instructions. Ideally, the vehicle stability control and detailed aspects of the altitude, direction, and attitude control would be controlled autonomously by the vehicle, leaving only higher-level instructions to the external controller. Such higher-level instructions might include heading and altitude, or go-right/go-left instructions, without detailed attitude instructions. Autonomous control would also be advantageous for engine thrust control and propellant usage minimization.

The art of remote control and autonomous control of flying vehicles, including helicopters, is well advanced. FIG. 4A is a simplified block diagram of a controller responsive to images from a line-scan camera 446 of FIG. 4B to determine the spin, and for communicating with an autonomous controller 448 or by radio (or equivalent) 449 with a remote control source 450. FIG. 4B illustrates a flyer such as 10 of FIG. 1A carrying a line-scan camera 446 which repeatedly scans a line 447 across a street scene illustrated as 444. A vertical edge 442 in the scene, or any other vertical edge, can be used as a reference. In general, the "forward" direction is determined by estimating the angle of the airfoil or blade relative to the rotor disk using a precision clock in an on-board processor synchronized with the rotation rate and phase. The arrangement of FIG. 4A receives a scene input from the scanning camera 446, as suggested by block 412, and produces a signal which represents the angle of the rotor blade relative to an arbitrarily selected "front" direction. A block 414 represents the synchronization of a virtual clock signal with the repeating image, and the identification of one or more reference vertical features of the scent. The stabilized scene information is transmitted to a remote control location, as suggested by block 449. Block 416 represents the correlation of the data extracted from the camera image with data from other sensors, such as a horizontally-disposed laser range finder or magnetometer. Block 418 represents the controlled actuation of gas valves, as described in more detail in conjunction with FIGS. 5A, 5B, 5C, and 5D to implement motion in the selected "forward" direction. The "forward" direction information is provided from block 416 to an autonomous controller illustrated as a block 448. Remote-control and autonomous systems for control of unmanned helicopter vehicles are known. The principles of such systems can be adapted for use with a vehicle according to an aspect of the invention. When operating autonomously, controller 448 produces signals which are ultimately made available to the control valve subroutine of block 418 to control the attitude and direction of the vehicle.

The line-scan image is stabilized by addressing the image information using the tracking clock described in conjunction with FIG. 4. A portion of the image is selected as representing the "front" view, and further control uses this information to aid in navigation. A 128-pixel vertical-line scan camera is believed to be sufficient to provide a picture with sufficient resolution to allow an operator to guide the vehicle into tight spaces, while placing a relatively low load on the communication system. Bandwidth compression techniques can be used if desired when transmitting the camera pictures.

Figure 5C:
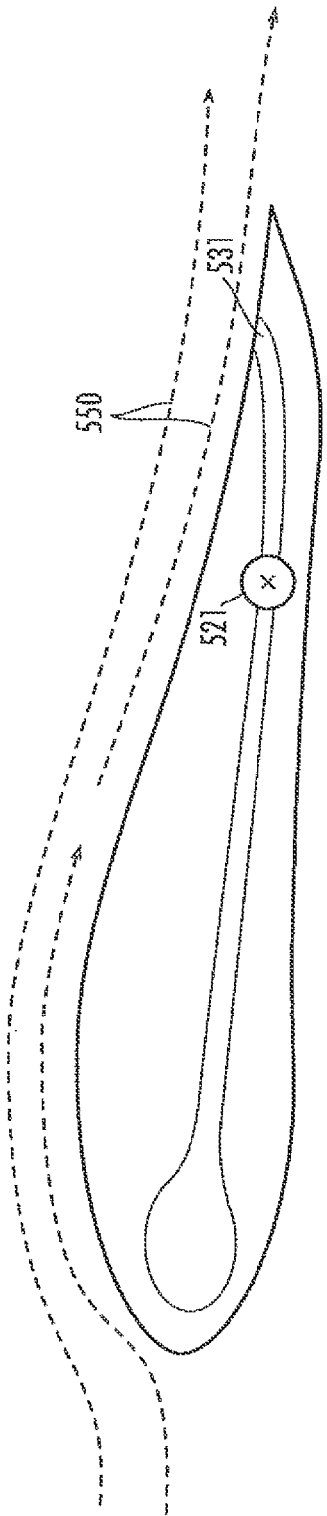
FIG. 5A is a simplified transverse cross-sectional view of an airfoil of the vehicle of FIGS. 1A, 1B, and 1C, showing a location for bleeding pressurized gas from the propulsion system, for selectively ejecting the pressurized gas at the trailing edge of the airfoil for increasing or decreasing lift.
FIG. 5B is a plan view at the location of FIG. 5A illustrating the use of a plurality of ejection points for the pressurized gas, and FIGS. 5C and 5D together illustrate the effect of the jets on the airflow.
Figure 5D:
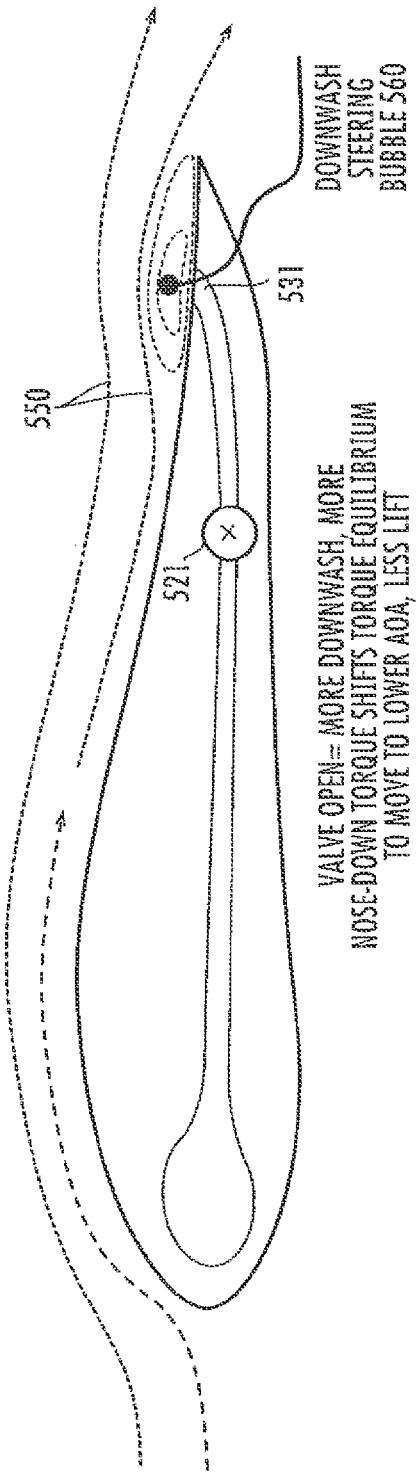

As so far described, the vehicle is spinning in an aerodynamically stable manner, and the "forward" direction of travel is known. Instructions are generated either autonomously or from an external controller to proceed in some selected direction. For simplicity, an explanation of the forward direction is selected. In order to cause the vehicle to move in the selected direction, the rotor disk must tilt relatively upward at the "rear," or downward at the "front." In order for the rotor disk to tilt, the rotating airfoil or blade must exhibit differential lift. More particularly, the lift when the airfoil is at the 180° (rearward) position on the rotor disk must be greater than the lift when the airfoil is at the 0° (forward) position on the rotor disk. Control of the lift of the airfoil is accomplished according to an aspect of the invention by selectively ejecting pressurized gas from the trailing edge of the airfoil in a direction selected to increase or decrease lift, as a function of angular position of the airfoil or blade relative to the rotor disk. FIG. 5A is a simplified diagram representing a cross-section of the airfoil or blade of FIGS. 1A, 1B, and 1C at a location designated 5-5 in FIG. 1A. As illustrated in FIG. 5A, the housing 262 of chamber 266 opens at this particular cross-section into a tube-fed manifold arrangement 512, 514. Chamber 266 provides relatively cool, pressurized gas by way of manifold 514 to a pair of microelectromechanical valves 521, 522. Valves 521 and 522, when electrically energized, allow the flow of the pressurized gas to upwardly-directed jet 531 and downwardly-directed jet 532. Jets 531 and 532 are mounted at or immediately adjacent to the trailing edge 12*te* of the airfoil 12. FIG. 5C is a simplified cross-sectional view similar to FIG. 5A, illustrating only valve 532 and upwardly-directed jet 531, during a time at which the valve 532 is closed to prevent the flow of gas to the jet. Under this condition, the streamlines, illustrated as 550, flow smoothly over the region of jet 531. The upwardly directed jet 531, when valve 521 is opened to allow gas to flow, directs the flow of gas in an upwardly skewed plane 598*u* relative to the rotor plane, as illustrated in FIG. 5A. This creates a separation or steering bubble 560 adjacent jet 531 as illustrated in FIG. 5D. The separation bubble forces the airflow, as represented by streamlines 550, up and over the bubble 560. The effect is equivalent to adding more camber to the airfoil at the location of the jet 531, thereby increasing the lift at that point. Moving the chordwise lift distribution toward the trailing edge changes the pitching moment balance and causes the airfoil to pitch nose down, thereby reducing angle of attack of the airfoil and its overall lift production. Downwardly-directed jet 532 of FIG. 5A directs the gas to the underside of the airfoil and performs the symmetrically opposite function as 531 for the upper surface. In a preferred embodiment, only one valve and jet, say 521 and 531, is needed—the other being redundant. In order to tilt the rotor disk to direct the vehicle in the forward direction, the lift of the airfoil is increased when at the 180° (rearward) position on the rotor disk, by closing microelectromechanical valve 521 to cut off the supply of gas to jet 531, thereby reducing the nose-down torque on the airfoil, allowing its angle of attack to increase and its lift production to increase. A half-rotation later, when the airfoil is at the 0° (forward) position on the rotor disk, the process is reversed: valve 521 is open, gas is flowing into the bubble increasing the downwash from the trailing edge and thus the nose down torque, reducing the angle of attack and the lift. The valve or valves is (are) actually operated many times as the airfoil advances around the stations of the compass, so that the size of surface bubble waxes and wanes evenly, or nearly so, during each circuit of the airfoil. Thus, the rotor disk experiences increased lift at its rearmost position and relatively decreased lift at its forward portion. The resulting tilt of the rotor disk causes the vehicle to tend to move in the selected forward direction.

FIG. 5B is a simplified plan view of a portion of a region of the airfoil 12 of FIG. 5A, partially cut away to reveal interior details. In FIG. 5B, it can be seen that controllable valve 521 can control the compressed gas to a plurality of upwardly-directed jets, designated 531*a*, 531*b*, 531*c*, 531*d*, and 531*e*, spaced along the trailing edge 12*te* of the airfoil 12. If desired, a control valve equivalent to valve 514 can be used to separately control the flow of compressed gas to each of the individual upwardly-directed jets 531*a*, 531*b*, 531*c*, 531*d*, and 531*e*. It will be understood that there may be a plurality of downwardly-directed jets, controlled by valve 522 in the same manners as described for the upwardly-directed jets.

Figure 6A:
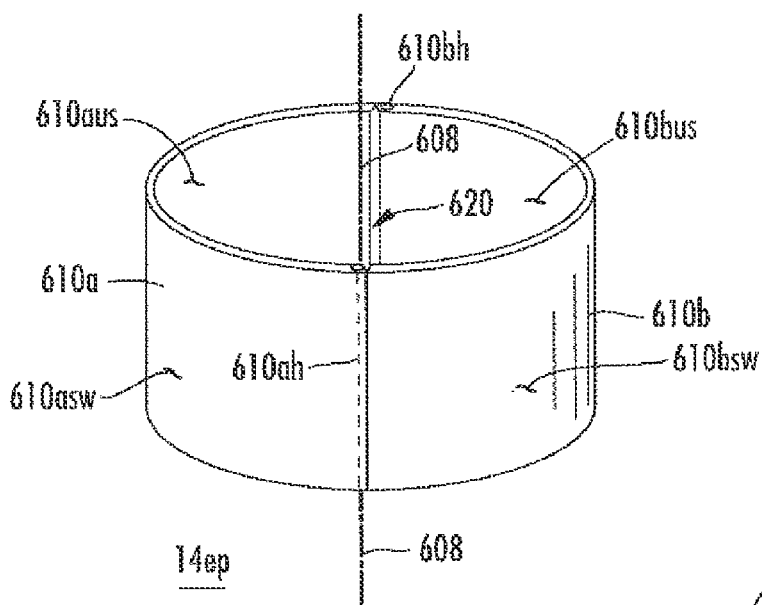
FIG. 6A is a simplified perspective or isometric view of an ejectable payload object enclosed in hinged covers.
Figure 6B:
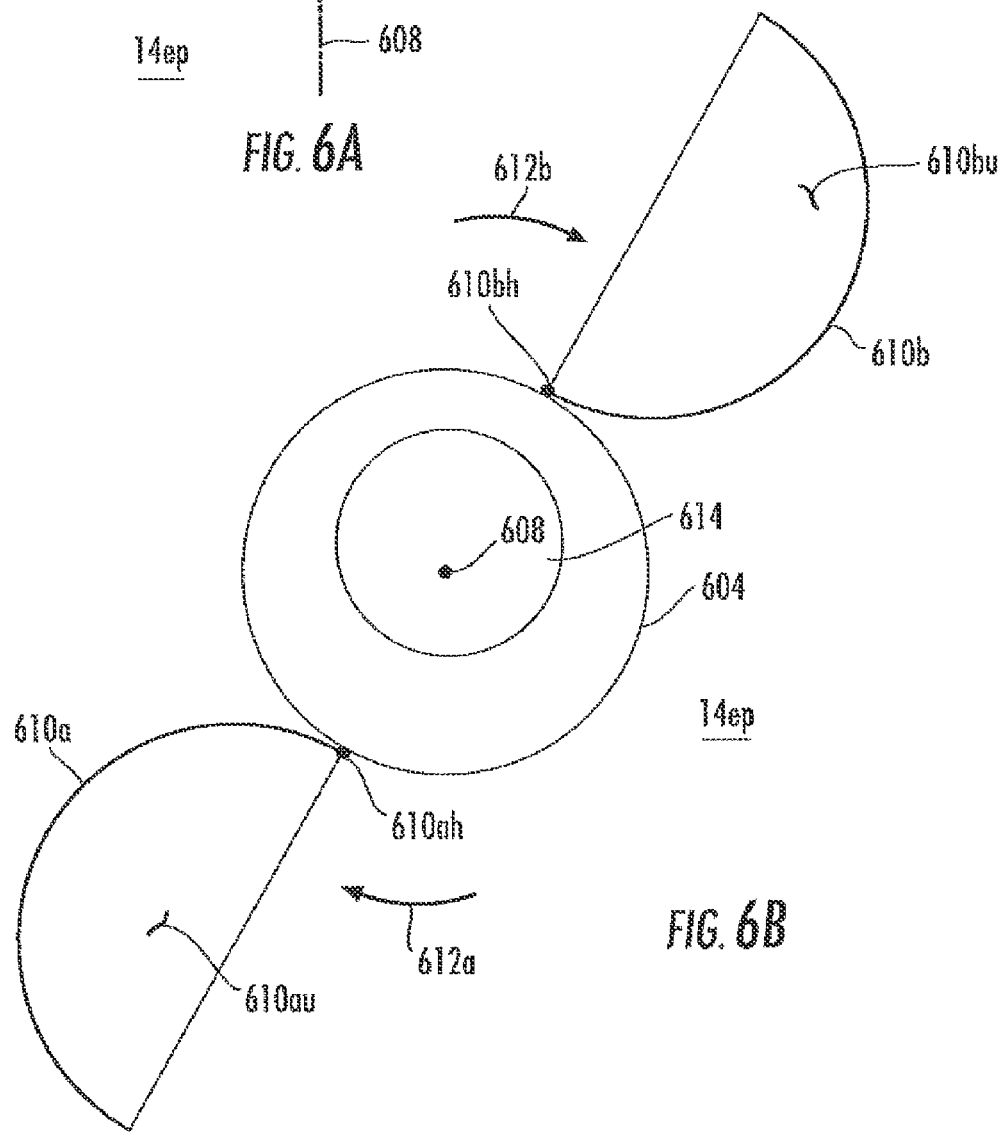
FIG. 6B is a plan view of the structure of FIG. 6A after entering the airstream upon deployment.

As so far described, the vehicle is adapted to reconnaissance by virtue of its ability to fly into desired regions, and to use sensors to report conditions at the desired locations. The television camera can provide very valuable information to a remotely located operator. The "payload" as so far described has been the body portion which is fixed to the root end of the airfoil, and which carries the various sensors. It may sometimes be advantageous to be able to drop an object, such as a remote sensor, from the airborne vehicle. The conventional name for such an object is also "payload." In order to avoid confusion, the object dropped is called an "object." Referring again to FIG. 1B, an ejectable payload object is illustrated as a disk-like object designated 14*ep*, which is attached or affixed to the "bottom" of the payload portion 14 of the vehicle 10. FIG. 6A is a simplified illustration of a payload object 14*ep* in its stowed state, suitable for being transported by the vehicle, and FIG. 6B is an illustration of the payload object 14*ep* in a state following deployment or ejection from the vehicle. In the stowed state illustrated in FIG. 6A, the payload object 14*ep* has the form of a right circular cylinder defined around an axis 608. The payload object 14*ep* incorporates first and second "drag wings" 610*a* and 610*b*, respectively, folded against the sides of the payload object. These wings are hinged so that they can open to extend radially outward from the payload object when the payload object is released from the body of the vehicle. First drag wing 610*a* defines a semiannular side wall 610*asw* and half-circular top wall or surface 610*aus*. First half drag wing 610*a* is hinged to the underlying structure by a vertically disposed hinge 610*ah*. Similarly, second drag wing 610*b* defines a semiannular side wall 610*bsw* and an upper half-circle top wall or surface 610*bus*. Second drag wing 610*b* is also hinged to the underlying structure by a vertically disposed hinge, a portion of which is illustrated as 610*bh*. The first and second semiannular side walls are separated from each other by a separation, part of which is designated 620.

FIG. 6B is a simplified top view illustrates the state of the payload object 14*ep* of FIG. 6A after it is deployed or ejected from the vehicle 10 of FIGS. 1A, 1B, and 1C. Since the vehicle 10 spins in normal flight, the deployable payload object 14ep also spins. On release of the payload object from the vehicle body, the drag wings spring open assisted by centrifugal forces and quickly reduce the rotational energy and rotation rate (the rotation energy is proportional to the square of the rotation rate, so the energy drops off faster than the rate. When so opened or deployed, the drag wings act as anti-spin spoilers or air brakes, which tend to reduce the spin. Reduction of spin is desirable to aid in precise placement of the payload object 14ep in the target area, by preventing the object from "skittering" and moving uncontrollably energy. This skittering is also reduced by the fact that the drag wings are fashioned from an elastic material, as opposed to or vice a rigid material, so that they absorb shock. On contact with an alightment surface, the drag wings are torn away revealing an adhesive 614 of FIG. 6B, that helps the payload object remain where it lands.

Figure 8A:
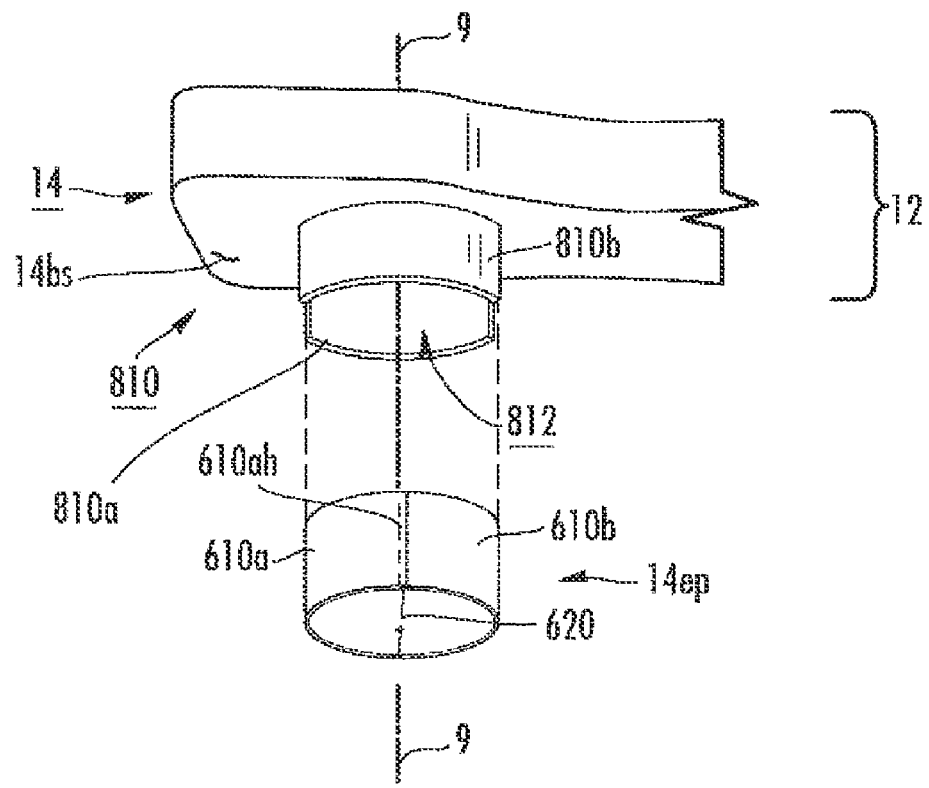
FIG. 8A is a simplified perspective or isometric view of one possible way to mount the deployable payload object of FIGS. 6A and 6B to the vehicle of FIGS. 1A, 1B, and 1C.
Figure 8B:
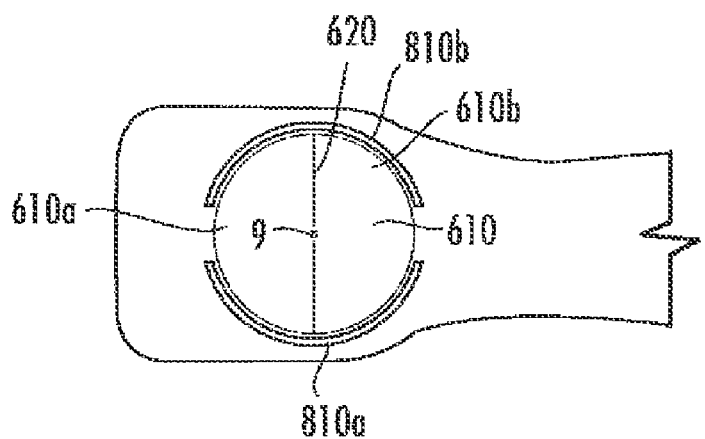
FIG. 8B is a plan view illustrating the result of the mounting of FIG. 8A.

It will be clear that if the anti-spin spoiler or drag wings of the payload object are exposed to the airstream while the payload object is being carried, the drag wings will open spontaneously, which might introduce excessive rotational drag while the payload object is still attached to the airfoil/payload combination. FIG. 8A is a simplified perspective or isometric view of a payload 14 portion of a flying vehicle 12, showing the bottom surface 14bs of the payload 14. A wall arrangement 810 includes an attached pair of partially circular or semicircular walls 810a, 810b, which together define a generally cylindrical cavity 812, having at least a diameter suitable to accommodating the payload object 14ep. The function of the walls 810a, 810b is to prevent wind action from seizing the drag wings 610a, 610b and opening them during flight. The height or projection of the walls 810a, 810b can be the same as the height of the right circular cylinder defined by the payload object 14ep, in which case the drag wings 610a, 610b are pretty much protected against wind. As an alternative, the height of walls 810a, 810b can be less than the height of the right circular cylinder defined by payload object 14ep, in which case the drag wings are partially protected from wind. Being only partially protected, there might be some forces tending to open the drag wings 610a, 610b, but they cannot open in any case because of the presence of the walls 810a, 810b standing in the path of opening. FIG. 8B is a plan view of the lower surface of the structure of FIG. 8A, showing the walls 810a, 810b. As an alternative, the two walls 810a, 810b may be joined by additional wall segments so as to define a complete 360° enclosure, thereby providing more protection against wind.

Figure 9:
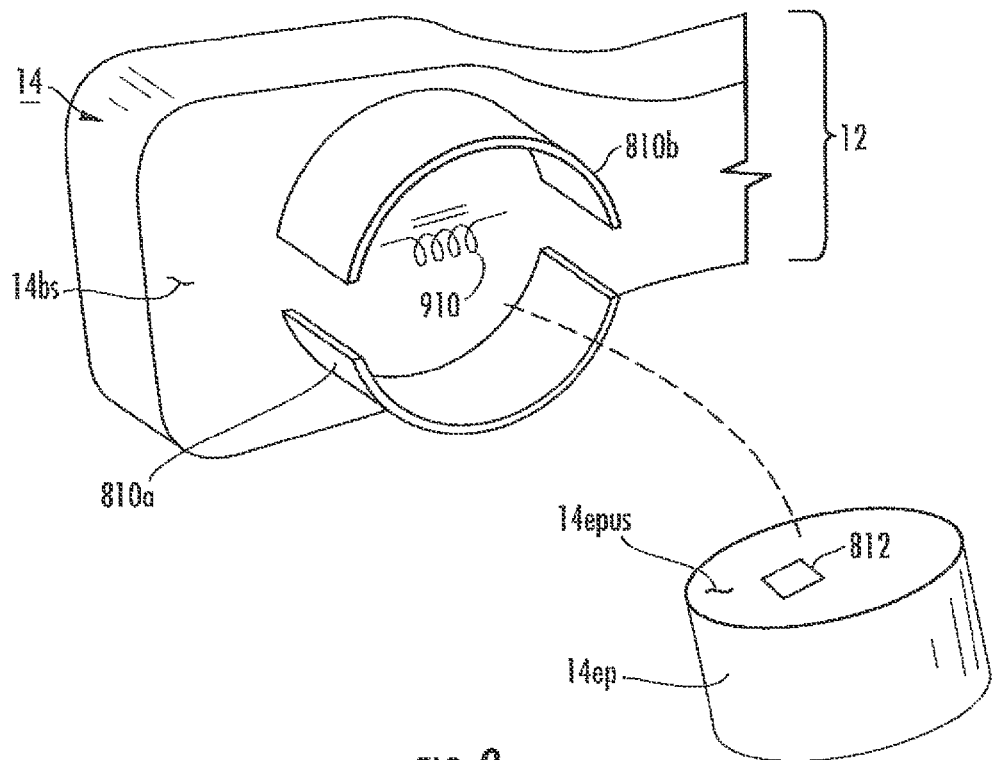
FIG. 9 is a simplified perspective or isometric view of the bottom portion of the payload of the vehicle of FIGS. 1A, 1B, and 1C, together with a deployable payload object, illustrating a possible retaining means.

The payload object 14ep can be held to the underside 14bs of the payload of the vehicle 10 by a magnetic device. If the payload object 14ep includes a magnetically permeable material, a simple electromagnet mounted on the bottom or lower surface 14bs can hold the payload object in place until such time as ejection or deployment is desired. FIG. 9 is an exploded perspective or isometric view illustrating, in notional form, a controllable electromagnet 910 associated with the bottom or payload-object-supporting side of the payload body 14 of the vehicle 10. FIG. 9 also illustrates the payload object 14ep with a magnetically permeable portion 812, which is either inherently part of the payload object, or is added to allow controlled stowage, carriage and deployment. The magnetically permeable portion 812 is centered on that side or surface 14epus of the payload object 14ep which faces the bottom surface 14bs of the payload 14 of the vehicle 10, where it can interact with electromagnet 910. When the electromagnet 910 is actuated, the deployable payload object 14ep is held to the vehicle 10, and when the electromagnet 910 is deenergized, the deployable payload object is released or deployed. If the magnetically permeable portion 812 holds some remanent field, deployment might be aided by reversing the magnetic field of electromagnet 910, thereby tending to repel the deployable payload object 14ep.

Figure 10A:
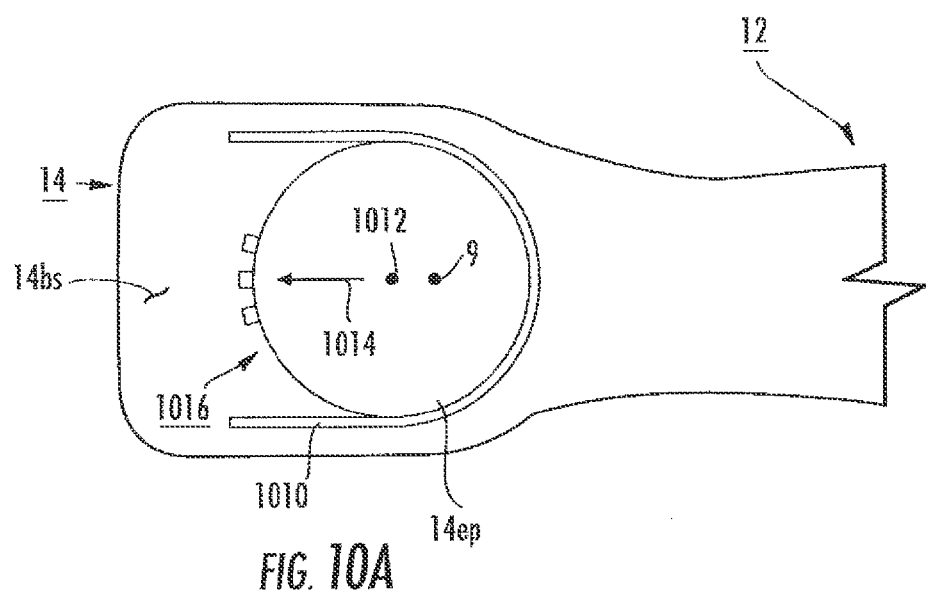
FIG. 10A is a simplified plan view of the bottom surface of the payload portion of the vehicle of FIGS. 1A, 1B, and 1C, showing an alternative structure for deployment of the deployable payload object of FIGS. 6A and 6B.
Figure 10B:
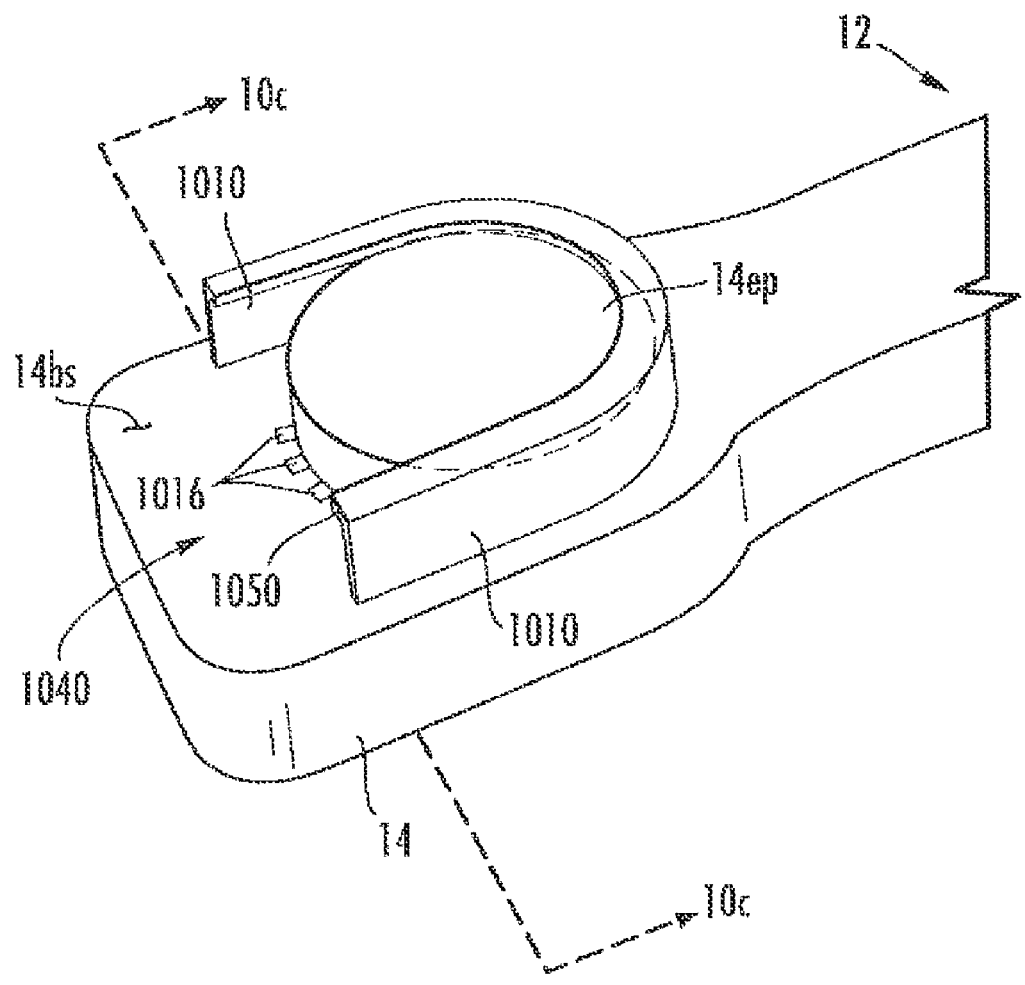
FIG. 10B is a simplified perspective or isometric view thereof.
Figure 10C:
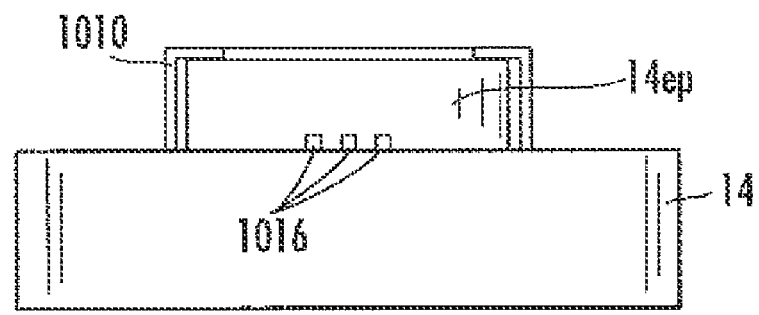
FIG. 10C is an end view of the structure of FIGS. 10A and 10B.

As an alternative to the electromagnet described in conjunction with FIG. 9, the deployable payload 14ep might be mounted and held slightly away from the center of mass of the vehicle 10, so that some small centrifugal force tends to eject the deployable payload object. A microelectromechanical latch can hold the deployable payload object against the small force, but release it when actuated. This would tend to fling the deployable payload object in a direction related to the rotational position of the vehicle at the time that the microelectromechanical latch releases the deployable payload object 14ep, which might be advantageous for some scenarios. FIG. 10A is a plan view of the bottom surface 14bs of the payload or body portion 14 of a vehicle 10 which illustrates one possible way to accomplish the desired result. In FIG. 10A, the bottom surface 14bs of the payload portion 14 bears a retaining and wind-protecting wall 1010, which includes a circular portion centered on a point 1012, somewhat displaced in the direction of arrow 1014 from the center of mass 9 of the vehicle 10. The right-circular-cylindrical deployable payload object 14ep lies against the circular portion of wall 1010, and slightly offset from the center of mass 9. Rotation of the vehicle 10 tends to cause a force tending to move the deployable payload object 14ep in the direction of arrow 1014. Movement of the deployable payload object 14ep in the direction of arrow 1014 from the illustrated rest position is prevented by one or more microelectromechanical trip devices designated together as 1016. These devices when holding the deployable payload object project from the bottom surface 14bs of the payload portion 14 of the vehicle, preventing the deployable object from moving in the direction of arrow 1014. When tripped, the trip device(s) 1016 are either ejected or withdrawn under surface 14bs, in either case releasing the deployable payload object 14ep to move in the direction of arrow 1014 under the impetus of inertial forces, thereby accomplishing the deployment. FIG. 10B is a perspective or isometric view of the arrangement of FIG. 10A, showing that the side walls 1010 affixed to the lower surface of the flyer 10 may have retaining lips 1050 which overhang a portion of the deployable payload object 14ep to retain it in place, allowing egress only by way of the "opening" 1040. As illustrated in FIG. 10B, the retaining trip devices are three in number. FIG. 10C is an end view of the structure of FIG. 10B looking in the direction of section lines 10c-10c.

FIGS. 11A, 11B, and 11C illustrate another arrangement for stowing the deployable payload object 14ep. In FIGS. 11A and 11B, the deployable payload object 14ep includes at least one retaining tab or tang 1114 which fits under an overhanging lip portion 1114L. The deployable payload object also defines a shaped depression 1014d (not visible in FIG. 11B). When the deployable payload object 14ep of FIG. 11A is mounted to the air vehicle body 14, the retaining tang can be fitted under lip 1114L as illustrated in FIG. 11A, and the other side of the payload object 14ep can be fitted into a recess 14r with shaped depression 1114d aligned with a retaining latch 1120. The retaining latch 1120 can be a shape memory actuator which can be energized by piezoelectric effects, magneto-resistive effects, or thermal heating effects, as known in the art. The retaining latch 1120 assumes the locked position illustrated in FIG. 11A, and can be energized to the unlocked position illustrated in FIG. 11C, which releases the latch 1120 from the shaped depression 1014d to thereby release the deployable payload object 14ep of FIG. 11A from the body 14. A spring or other mechanical energy storage device 1124 provides a mechanical bias which tends to urge the deployable payload object 14ep away from contact with the vehicle body 14.

Figure 12:
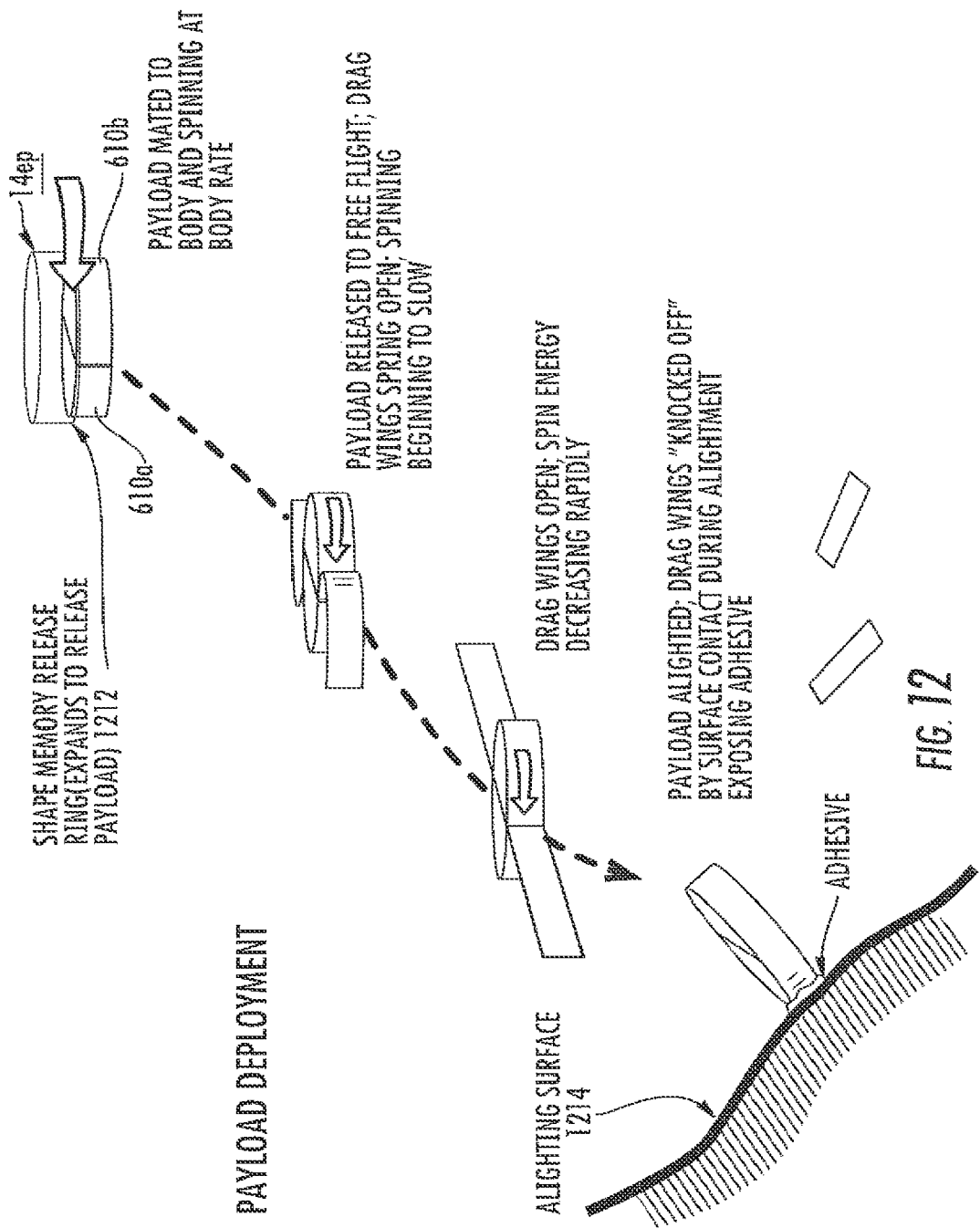
FIG. 12 is a notional illustration of various states in the deployment of an embodiment of a deployable payload object.

FIG. 12 illustrates a notional deployment of a deployable payload object. In FIG. 12, the drag wings 610a, 610b of the deployable payload object 14ep are initially retained in place by a shape memory ring 1212. Relaxation of the shape memory ring allows the drag wings to deploy and they spring open, whereupon the spin rate slows. When the drag wings are fully deployed, the spin energy decreases rapidly. Eventually, the deployed payload object 14ep alights on an alighting surface 1214; the drag wings are knocked off by the impact or by the shearing force of adjacent objects. The contact adhesive is exposed by the removed wings, and tends to cause the vehicle to stay at the site at which it alights.

The altitude of the vehicle above the local terrain can be established by the inclusion among the sensors in region 46 of FIG. 1 of a downward-looking "radar" altimeter. Since the wavelengths of radar signals tend to be relatively large by comparison with the size of the vehicle, it is anticipated that a light-operated "lidar" equivalent will be used. The principles of lidars are well known in the art. The measured altitude can be transmitted to the remote controller or operator who can use the information to aid in control if the vehicle cannot be directly observed. As an alternative, the measured altitude can be provided to an autonomous navigation controller. The autonomous controller can use the altitude information from the lidar to increase or decrease the lift of the rotor disk in order to maintain a given altitude or to follow an altitude program.

While a downward-looking lidar altitude determination can give altitude, a side-looking lidar rangefinder can provide a rotating scan for determining proximity of surrounding objects such as trees or large rocks in an outdoor setting, or walls in an interior context. This simply requires correlating the scanned proximity information with the rotation rate which is known from the scanning optical camera. As an alternative, the scanning proximity signal can itself be used to aid in determining the rotation rate in much the same fashion as that for the scanning camera, by noting the recurrence rate of objects at particular distances.

Figure 7A:
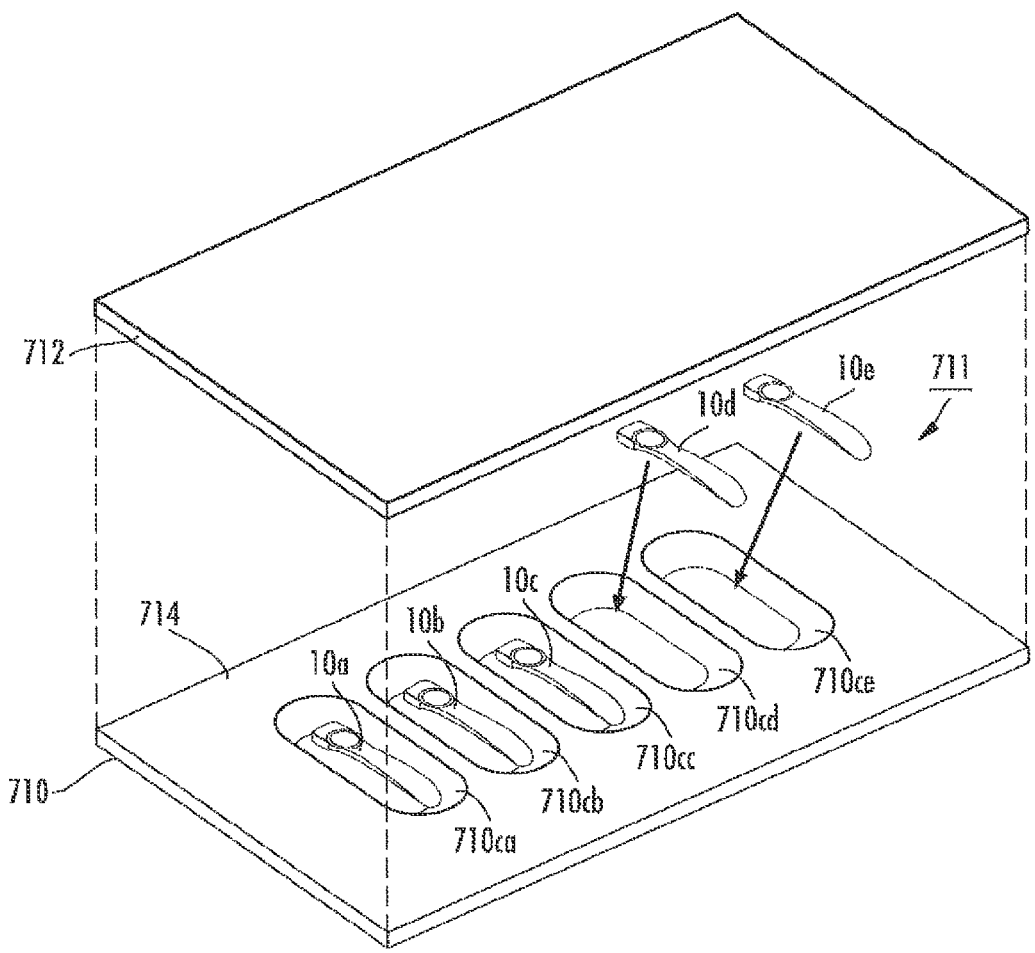
FIG. 7A illustrates one possible packaging method for flying vehicles.
Figure 7B:
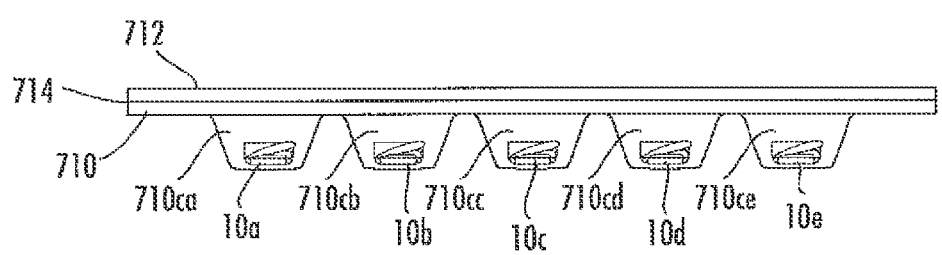
FIG. 7B illustrates the result of the method.

One of the problems with existing reconnaissance flying vehicles is that of protecting them in the interim between initiation of a ground force action and the later time at which the flying vehicle is used during the operation. It will be appreciated that a flying vehicle must be protected against mud, water, and extreme shock notwithstanding that the particular trooper carrying the vehicle is exposed to these conditions. According to an aspect of the invention, the flying vehicle(s) is (are) protected by a common blister pack which is preferably hermetic or at least very tight. The blister pack may be individual, or may be a multiple pack such as those potable packs in which medical tablets or capsules are stored for later use. FIG. 7A shows the elements of a blister pack before closing, and FIG. 7B is a side elevation view of the structure of FIG. 7A in its assembled state. As illustrated in FIG. 7A, a first piece 710 in the form of a sheet defines a set 710 of a plurality of open cavities or depressions 710ca, 710cb, 710cc, 710cd, and 710ce. A generally flat cover sheet 712 is dimensioned to cover the cavity(ies) of set 710. The individual flyers 10a, 10b, 10c, 10d, and 10e are placed in cavities 710ca, 710cb, 710cc, 710cd, and 710ce, respectively, and the cover sheet 712 is affixed to the flat portions of piece 710 with some kind of adhesive, illustrated as a surface 714. As an alternative to the use of adhesive, the two pieces 710, 712 can be welded as by ultrasonic or heat, to for closed cavities. If desired, a bit of foam or other resilient material can be placed in each cavity before closing to restrain the flying vehicle against movement within the cavity.

While the thrust provided by nozzle or jet 270 of FIG. 1A is near the distal end or tip end 12$_2$ of the airfoil or wing 12, those skilled in the art know that the nozzle or jet may be at a location lying between the tip end 12$_2$ and the root end 12$_1$, but that less torque will be developed for a given thrust. Some embodiments of the vehicle 10 may include photovoltaic "solar" panels or cells for augmenting the on-board batteries with locally produced power. It might even be possible to recharge the batteries of a vehicle after a period of rest while exposed to sunlight. Another version might incorporate high-efficiency thermophotonic or thermophotovoltaic cells, positioned adjacent the fuel grains to take advantage of the heat generated therein during operation.

An apparatus for flight (10) according to an aspect of the invention comprises an airfoil (12) with an attached payload (14, 14ep), and propulsion means (210) associated with the airfoil (12) for rotating the airfoil (12) and the attached payload (14, 14ep), for thereby defining a rotor disk (99). The apparatus (10) also comprises physical means (510) for adjusting the lift of the airfoil (12), and control means (410, 510) coupled to the physical means (510) for causing the lift adjustment of the airfoil (12) to tilt the rotor disk (99). In one embodiment, the rotating airfoil (12) defines a leading edge (12e) and a trailing or lagging (12te) edge, and the physical means (510) comprises means (512, 514, 521, 522, 531a, 531b, . . . ) for ejecting gas at a location (533) near the trailing edge (12te) in at least one plane (598u, 598d) which does not coincide with, or is skewed relative to, the plane of the rotor disk (99). In a preferred embodiment, the means (512, 514, 521, 522, 531a, 531b, . . . ) for ejecting gas includes means for ejecting gas in a generally periodic manner in the plane not coincident (598u, 598d) with the rotor (99). In one embodiment, the airfoil (12) of the apparatus is elongated, and defines a distal end (12$_2$) remote from the payload (14, 14ep), and the propulsion means (210) comprises a solid-fuel powered bypass jet, with an exhaust directed (12t) generally perpendicular to an axis (8) of the elongation of the airfoil (12). In one version, the exhaust is directed generally in the plane of the rotor disk (99). The transverse location of the exhaust may lie generally between the distal end (12$_2$) of the airfoil (12) and the payload (14, 14ep), or it may be at the distal end (12$_2$) of the airfoil (12).

According to another aspect of the invention, an apparatus (10) for moving a load in a selected direction comprises an airfoil (12) with a fixedly attached payload (14, 14ep), and propulsion means (210) associated with the airfoil (12) for rotating the airfoil (12) and the attached load (14, 14p), for thereby rotating the airfoil (12) to define a rotor disk (99). Physical means (510) are provided for adjusting the lift of the airfoil (12). Control means (410, 510) are coupled to the physical means (510) for causing the lift adjustment of the airfoil (12) to tilt the rotor disk (99) in a manner which moves the airfoil (12) with the attached load in the selected direction.

A flying apparatus (10) according to another aspect of the invention is for moving a load (14, 14p). The apparatus (10) comprises an airfoil (12) with an attached load (14, 14p) fixed to the airfoil (12), and propulsion means (210) associated with the airfoil (12) for rotating the airfoil (12) and the attached load (14,14p) together, for thereby defining a rotor disk (99). Physical means (510) are provided for adjusting the lift of the airfoil (12), and control means (410, 510) are coupled for causing the lift adjustment of the airfoil (12) to provide at least one of collective and cyclic control.

A flying apparatus (10) according to a further aspect of the invention comprises an airfoil (12) with an attached load (14,14p) adjacent a first end of the airfoil (12), and a jet (270) lying between the first (12$_1$) and second (12$_2$) ends of the airfoil (12) for rotating the airfoil (12) and attached load (14, 14ep).

An apparatus (10) for flight according to an aspect of the invention comprises an airfoil (12) with a payload (14, 14ep) which is fixed to the airfoil (12), and propulsion means (210) associated with the airfoil (12) for rotating the airfoil (12) and the payload (14, 14ep), thereby defining a rotor disk (99). The airfoil (12) with payload (14, 14ep) fixed thereto has no attached payload (14, 14ep) which rotates at a rate other than the rotation rate of the airfoil (12). Physical means (510) adjust the lift of the airfoil (12), and control means (410, 510) are coupled to the physical means for causing the lift adjustment of the airfoil (12) to tilt the rotor disk (99).

An apparatus (10) for flight comprises an airfoil (12) with a fixedly attached body (14), where the airfoil (12) and fixedly attached body (14) together defining a center of mass. The attached body includes payload attachment means (810, 812; 910, 1016, 1120) for attaching a payload (14ep) centered on the center of mass (8), which payload (14ep), when attached, is fixedly attached to the body (14). A payload (14ep) is coupled to the payload attachment means (810, 812; 910, 1016, 1120), and propulsion means (210) are associated with the airfoil (12) for rotating the airfoil (12) and the fixedly attached body (14), for thereby defining a rotor disk (99). Physical means (510) are provided for adjusting the lift of the airfoil (12). Control means (410, 510) are coupled to the physical means for causing the lift adjustment of the airfoil (12) to tilt the rotor disk (99), and control means are provided for controlling the payload attachment means (810, 812; 910, 1016, 1120) for disengaging the body (14) from the payload (14ep) at selected one of (a) time and (b) location.

An apparatus (10) for flight according to an aspect of the invention comprises an elongated airfoil (12) with an attached payload (14, 14ep), which airfoil (12) defines a longitudinal axis (8). Propulsion means (210) are associated with the airfoil (12) for rotating the airfoil (12) and the attached payload (14, 14ep), for thereby defining a rotor disk (99). The propulsion means (210) comprises means (210, 224, 230, 252, 266) for generating gas under pressure and means (270) for releasing the gas under pressure in a direction (12t) generally tangent to a radius of the rotor disk (99) and from a location near an end (12$_2$) of the airfoil (12). The propulsion means (210) in one embodiment of this aspect of the invention comprises an ejector (230, 266) driven by a fuel grain (310a, 310b, . . . ), and the fuel grain (310a, 310b, . . . ) may generate hot gas which is partially combustible. In another embodiment according to this aspect of the invention, the means (210, 224, 230, 252, 266) for generating gas under pressure comprises a fuel grain (310a, 310b, . . . ) which, in operation, creates partially combustible hot gas under pressure, and a first ejector (230) into which the partially combustible hot gas under pressure is introduced, for mixing the partially combustible hot gas with atmospheric oxygen (228), to generate hot combusted gas. A second ejector (266) receives the hot combusted gas, and heats atmospheric gas (264) to generate the gas under pressure (GUP).

A protective package (710, 712) according to another aspect of the invention is for individually protecting flying vehicles (10a, 10b, 10c, 10d, 10e). The protective package (710, 712) comprises a first piece (710) defining a cavity (set 711) in which each cavity is larger in length, width and depth than corresponding dimensions of the flying vehicle (10). A second piece (712) is provided having dimensions sufficient to occlude or close off the entirety of the cavity(ies) (set 711).

Means (714) are provided for affixing the second piece (712) to the first piece (710) so as to define with the cavity (set 711) a closed package containing the flying vehicle. The means may be adhesive or welding, rivets, or any other attachment. In one embodiment, at least one of the first plastic piece and the second piece (712) is transparent. Either the first piece (710) or the second piece (712), or both, may be of a plastic material. The second piece (712) may be monolithically hinged to the first plastic piece to define a clamshell.

A protective package (710, 712) according to another aspect of the invention is for accommodating a plurality of flying vehicles (10a, 10b, 10c, 10d, 10e) and includes a first generally planar piece (710) defining a plurality, equal in number (five in the example of FIGS. 7A and 7B) to the number of the plurality of flying vehicles (10a, 10b, 10c, 10d, 10e), of individual open cavities (710ca, 710cb, 710cc, 710cd, 710ce). Each of the open cavities (710ca, 710cb, 710cc, 710cd, 710ce) is dimensioned to accommodate one of the flying vehicles (10a, 10b, 10c, 10d, 10e). The package also includes a second piece (712) dimensioned to occlude the plurality of individual open cavities. The second piece (712) is applied to the first piece (710) to occlude the open cavities and thereby define the plurality of closed cavities. Each of the closed cavities accommodates one of said flying vehicles (10a, 10b, 10c, 10d, 10e).

A method for storing flying vehicles (10a, 10b, 10c, 10d, 10e) according to a further aspect of the invention comprises the step of encapsulating each flying vehicle in shrink-wrap film, and heating the shrink-wrap film to cause the film to shrink about the flying vehicle.

Another method for storing flying vehicles (10a, 10b, 10c, 10d, 10e) according to an aspect of the invention comprises the steps of placing a flying vehicle in each cavity (set 711) of a sheet (710) defining plural cavities (set 711), and applying a single second sheet (712) over the open side of the plural cavities (set 711) to form sealed chambers, each holding one flying vehicle.

What is claimed is:

1. A monocopter, said monocopter comprising:
    an airfoil with a body attached to a first end of the airfoil, the body including an exterior surface;
    a propulsion device associated with said airfoil for rotating said air foil and said body, for thereby defining a rotor disk;
    a controller for causing lift adjustment of said airfoil to tilt the rotor disk; and
    a holder for a deployable payload object, the holder including at least one fixed wall extending outwardly from the exterior surface of said body, said wall and said exterior surface of said body defining a cavity of the body, said cavity dimensioned to accommodate said deployable payload object.

2. A monocopter according to claim 1, wherein said holder further includes:
    a retainer for retaining said deployable payload object within said cavity during stowed operation, and for releasing said deployable payload object from said cavity for deployment.

3. A monocopter according to claim 2, wherein said retainer comprises a latch which withdraws to release said deployable payload object.

4. A monocopter according to claim 2, wherein said retainer comprises a lip on said at least one wall.

5. A monocopter according to claim 2, wherein said retainer comprises an electromagnet.

* * * * *